United States Patent [19]
Takeuchi et al.

[11] Patent Number: 6,071,023
[45] Date of Patent: Jun. 6, 2000

[54] NEGATIVE HOLDER

[75] Inventors: Shigeru Takeuchi; Hideo Ishii; Eiji Ito; Shinichi Kuriyama; Katsutoshi Sawada, all of Tokyo, Japan

[73] Assignee: Konica Corporation, Japan

[21] Appl. No.: 09/039,844

[22] Filed: Mar. 16, 1998

Related U.S. Application Data

[63] Continuation-in-part of application No. 08/843,762, Apr. 21, 1997, abandoned.

[30] Foreign Application Priority Data

| Apr. 26, 1996 | [JP] | Japan | 8-106514 |
| May 16, 1996 | [JP] | Japan | 8-121554 |
| Mar. 21, 1997 | [JP] | Japan | 9-067564 |

[51] Int. Cl.$^7$ ................................................ G03D 13/08
[52] U.S. Cl. ............................ 396/647; 355/64; 242/528
[58] Field of Search ..................... 396/400, 568, 396/647; 242/528; 378/173; 355/64

[56] References Cited

U.S. PATENT DOCUMENTS

| 3,191,882 | 6/1965 | Riedel | 242/528 |
| 3,715,087 | 2/1973 | Schmidt | 242/528 |
| 3,743,200 | 7/1973 | Hommerin | 355/64 |
| 3,775,613 | 11/1973 | Hommerin | 378/173 |
| 3,776,114 | 12/1973 | Edwards | 396/400 |
| 3,961,760 | 6/1976 | Arnoldussen et al. | 242/528 |
| 5,361,112 | 11/1994 | Pummell et al. | 396/568 |

FOREIGN PATENT DOCUMENTS

0000227 1/1979 European Pat. Off. .

*Primary Examiner*—D. Rutledge
*Attorney, Agent, or Firm*—Jordan B. Bierman; Bierman, Muserlian and Lucas

[57] ABSTRACT

An apparatus for accommodating a photographic document comprises a web member; a first roller to which one end of the web member is fixed; and a driving force transmitting means for rotating the first roller to wind up the web member thereon so that the photographic document is wound around the first roller together with the web member.

34 Claims, 25 Drawing Sheets

NEGATIVE HOLDER

This is a Continuation-In-Part application of Ser. No. 08/843,762 filed Apr. 21, 1997, now abandoned, which is hereby incorporated in its entirety by this reference.

BACKGROUND OF THE INVENTION

The present invention relates to a negative holder, a method of holding a negative as one example of a photographic document, a device for holding a negative, a device for feeding out a negative and a photographic system.

Conventional negative holders used commonly in the past have been those wherein negatives are held in a cartridge or in a negative sheet, because it has been necessary for these holders to be returned to customers.

When negatives are handled by photofinishers in various apparatuses, it has been common in large-scale photofinishers that a large number of negatives are spliced and taken up in the form of a roll to be handled, and it has been common in mini-labs that negatives are handled without being protected by anything at all.

However, when a large number of negatives are spliced and taken up in the form of a roll to be handled, there is required not only a process to splice a large number of negatives but also a process to break down such spliced negatives into each piece. Therefore, additional work and time are required to prepare a given number of rolls of film for shipment. Since the roll of negatives is exposed when the roll is assembled, the negatives tend to attract dust and to be scratched thereby. Furthermore, if a large number of negatives is handled without protection, it is difficult to relate the specific negatives to the order relating thereto. Also, it is possible for the negatives to rub against each other and thereby cause further damage.

SUMMARY OF THE INVENTION

The first object of the invention is to provide a negative holder wherein negatives hardly come in direct contact with each other, it is not necessary to splice negatives, a large number of negatives can be held in succession, and they can be taken out without disturbing their order.

It was found that when negatives are held in the negative holder capable of holding plural negatives without splicing them, or when the negatives thus held are fed out of the holder, there are caused problems specific to the negatives.

Namely, when plural negatives belonging to one order are held in different negative holders in the case where negatives are held in a negative holder capable of holding plural negatives in succession without splicing them, it is time-consuming, in the succeeding process, to collect the negatives belonging to one order. When negatives belonging to one order are held in one negative holder, there is caused a problem that it is difficult to judge whether the negatives holder can hold all of the negatives or not, because the number of negatives in one order varies depending on the order. A problem of this kind is not found on a negative holder that holds one roll of negative, or on a negative holder holding plural negatives which are spliced with each other.

The second object of the invention is to make it possible that one negative holder holds negatives in one order without holding them in a different negative holder regardless of the order, and the negative holder holds the most possible negatives.

When negatives are held in a negative holder capable of holding plural negatives by taking them up without splicing them, it was found that the conveyance speed at which the negatives are conveyed to the negative holder, which is higher than the take-up speed at which the negatives are taken up, causes a problem that the negative is broken. Further, for making the take-up speed to be constant even when a diameter of the wound negatives grows greater as negatives are taken up, complicated mechanism is required compared with an occasion where spliced plural negatives are taken up, because plural negatives are taken up without being spliced to be held.

The third object of the invention is to make it possible, despite no complicated mechanism, that plural negatives are taken up to be held without being spliced.

When negatives held in a negative holder capable of holding plural negatives by taking them up without splicing them are fed out, it was found that the feed-out speed at which the negatives are fed out, which is higher than the conveyance speed at which the negatives are conveyed from the negative holder, causes a problem that the negative is broken. Further, for making the take-up speed to be constant even when a diameter of the wound negatives becomes smaller as negatives are taken up, complicated mechanism is required compared with an occasion where spliced plural negatives are taken up, because plural negatives are taken up to be held without being spliced.

The fourth object of the invention is to make it possible to feed out negatives from the negative holder capable of holding plural negatives, without breaking the negatives, by taking them up without splicing them, despite no complicated mechanism.

Objects of the invention can be achieved by the following items.

Item 1

A negative holder taking up negatives to hold them, wherein a first roller, a belt-shaped member or a web member whose one end is supported by the first roller, and an accumulating section where the other end of the belt-shaped member is accumulated, are provided.

Item 2

The negative holder according to Item 1, wherein an end on one side of the belt-shaped member is supported by the first roller so that the longitudinal direction of the belt-shaped member may be perpendicular to the axial direction of the first roller, and both the lateral direction of the belt-shaped member and the axial direction of the first roller may be horizontal.

Item 3

The negative holder according to Item 1 or Item 2, wherein first roller has conductivity.

Item 4

The negative holder according to either one of Items 1–3, wherein the belt-shaped member has conductivity.

Item 5

The negative holder according to either one of Items 1–4, wherein the accumulating section has a second roller that supports an end on the other side of the belt-shaped member, and the other end of the belt-shaped member is accumulated when the second roller takes up.

Item 6

The negative holder according to either one of Items 1–5, wherein the negative is inserted between the outermost circumference of the belt-shaped member taken up by the first roller and the belt-shaped member to be taken up by the first roller, and the negative is taken up and held when the first roller rolls in the belt-shaped member.

Item 7

The negative holder according to Items 6, wherein a third roller is provided so that its axial direction may be in parallel with the axial direction of the first roller, and the belt-shaped member is supported by the third roller and the first roller takes up one end portion of the belt-shaped member in an S-shaped form which is made by the first roller and the third roller.

Item 8

The negative holder according to Item 7, wherein the third roller has conductivity.

Item 9

The negative holder according to either one of Items 6–8, wherein the nipping position where the negative is nipped between the outermost circumference of the wound negative taken up by the first roller and the negative to be taken up by the first roller, is almost constant.

Item 10

The negative holder according to Item 9, wherein there is a guide which guides the negative toward the nipping position.

Item 11

The negative holder according to either one of Items 1–10, wherein a part of the guide is in contact with the outermost circumference of the wound negative taken up by the first roller.

Item 12

The negative holder according to either one of Items 1–10, wherein the guide is urged so that a part of the guide may be brought into contact with the outermost circumference of the wound negative taken up by the first roller.

Item 13

The negative holder according to either one of Items 10–12, wherein the negative taken up is fed out by rewinding the wound negative taken up by the first roller, and the negative thus fed out is guided by the guide.

Item 14

The negative holder according to either one of Items 6–10, wherein the negative taken up is fed out by rewinding the wound negative taken up by the first roller.

Item 15

The negative holder according to either one of Items 1–14, wherein there is provided, on the half way of a conveyance path for the negative, a metallic roller which comes in contact with the negative.

Item 16

The negative holder according to either one of Items 1–15, wherein there is provided a holder main body in which various members mentioned above are housed, and the holder main body has conductivity.

Item 17

The negative holder according to either one of Items 1–16, wherein the belt-shaped member is provided with a member to be detected for detecting the state in which a prescribed quantity of negatives that is greater than the maximum quantity corresponding to one order can be housed.

Item 18

A negative holding method for holding negatives by orders in the negative holder described in either one of Items 1–17, wherein the negative holder is sensed whether or not it can house a prescribed quantity of negatives that is greater than the maximum quantity corresponding to one order, and when it is sensed to be capable of housing the prescribed quantity of negatives, the negatives are held, while when it is sensed not to be capable of housing the prescribed quantity of negatives, the negatives are not held.

Item 19

The negative holding method for holding negatives by orders in the negative holder according to Items 18, wherein the prescribed quantity of negatives is greater than a quantity necessary to cover a long type negative in the maximum length corresponding to one order, or a quantity necessary to cover plural short type negatives corresponding to one order at intervals, whichever is greater.

Item 20

A negative holding method for holding negatives by orders in a negative holder capable of holding plural negatives by putting them side by side in succession without splicing them, wherein the negative holder is sensed whether or not it can house a prescribed quantity of negatives that is greater than the maximum quantity corresponding to one order, and when it is sensed to be capable of housing the prescribed quantity of negatives, the negatives are held, while when it is sensed not to be capable of housing the prescribed quantity of negatives, the negatives are not held.

Item 21

A negative holding device which makes negatives to be held in the negative holder described in either one of Items 1–17, wherein a conveyance means for conveying the negatives to the negative holder is provided, and the speed of the conveyance means for conveying the negatives is not higher than the lowest speed of the negative holder for taking up the negatives.

Item 22

A negative holding device which makes negatives to be held in the negative holder capable of holding plural negatives by taking them up without splicing them, wherein a conveyance means for conveying the negatives to the negative holder is provided, and the speed of the conveyance means for conveying the negatives is not higher than the lowest speed of the negative holder for taking up the negatives.

Item 23

A negative holding device which makes negatives to be held in the negative holder described in either one of Items 1–17, wherein a conveyance means for conveying the negatives to the negative holder is provided, and the speed of the conveyance means for conveying the negatives is constantly the same as or lower than the speed of the negative holder for taking up the negatives.

Item 24

A negative holding device which makes negatives to be held in the negative holder capable of holding plural negatives by taking them up without splicing them, wherein a conveyance means for conveying the negatives to the negative holder is provided, and the speed of the conveyance means for conveying the negatives is constantly the same as or lower than the speed of the negative holder for taking up the negatives.

Item 25

The negative holding device according to either one of Items 21–24, wherein there is provided a driving means which drives the negative holder to take up the negatives conveyed by the conveyance means.

Item 26

A negative feed-out device for feeding out negatives held in the negative holder described in either one of Items 1–17, wherein there is provided a conveyance means that conveys the negatives fed out of the negative holder, and the speed of the conveyance means for conveying the negatives is not lower than the highest speed of feeding out the negatives fed out of the negative holder.

Item 27

A negative feed-out device for feeding out negatives held in a negative holder capable of holding plural negatives by taking them up without splicing them, wherein there is provided a conveyance means that conveys the negatives fed out of the negative holder, and the speed of the conveyance means for conveying the negatives is not lower than the highest speed of feeding out the negatives to be fed out of the negative holder.

Item 28

A negative feed-out device for feeding out negatives held in the negative holder described in either one of Items 1–17, wherein there is provided a conveyance means that conveys the negatives fed out of the negative holder, and the speed of the conveyance means for conveying the negatives is constantly the same as or higher than the speed of feeding out the negatives from the negative holder.

Item 29

A negative feed-out device for feeding out negatives held in a negative holder capable of holding plural negatives by taking them up without splicing them, wherein there is provided a conveyance means that conveys the negatives fed out of the negative holder, and the speed of the conveyance means for conveying the negatives is constantly the same as or higher than the speed of feeding out the negatives to be fed out of the negative holder.

Item 30

The negative feed-out device according to either one of Items 26–29, wherein there is provided a driving means which drives the negative holder to feed out the negatives.

Item 31

A photographic system having therein the negative feed-out device described in either one of Items 26–30 and a photographic processing means conducting at least one of image pickup of the negative and exposure from the negative, while moving the negative conveyed by the conveyance means in the negative feed-out device, wherein there is provided an accumulator which temporarily holds the negative between the negative feed-out device and the photographic processing means, and the speed of the conveyance means for conveying the negatives is not lower than the highest speed for moving the negative moved by the photographic processing means.

Item 32

A photographic system having therein the negative feed-out device described in either one of Items 26–30 and a photographic processing means conducting at least one of picture-taking of the negative and exposure from the negative, while moving the negative conveyed by the conveyance means in the negative feed-out device, wherein there is provided an accumulator which temporarily holds the negative between the negative feed-out device and the photographic processing means, and the speed of the conveyance means for conveying the negatives is constantly the same as or higher than the speed for moving the negative moved by the photographic processing means.

Item 33

The photographic system according to Item 31 or Item 32, wherein the photographic processing means conducts picture-taking of the negative, then, conditions for printing are determined from the result of the picture-taking, and printing is made on a light-sensitive material for printing use from the negative subjected to the picture-taking under the determined conditions.

Item 34

The photographic system according to either one of Items 31–33, wherein the negative feed-out device and a device constituting the photographic processing means are united integrally.

Other Explanation

Negatives include a negative of a transmission type and a negative of a reflection type. The negative of a transmission type includes a silver halide photographic film which has been exposed and processed, a photographic film and a photographic dry plate obtained through processing of a photographic dry plate, a photographic film formed by a printer of a thermo-sensitive sublimation type, and a transferred image film onto which an image has been transferred. In addition, the negative includes one on which a plurality of image frames are recorded and one on which one image frame is recorded. The negative on which plural image frames are recorded includes one on which a plurality of image frames are arranged on a two-dimensional basis and one on which a plurality of image frames are arranged to form one line. In the invention, however, it is preferable that a negative on which plural image frames are recorded tandem is housed.

A typical negative on which a plurality of image frames are recorded includes those obtained by processing a 135 photographic film, a photographic film housed in a 110 cartridge, 120- or 220-standard photographic film, and a photographic film housed in an APS cartridge.

The negative further includes a long type negative which is a strip of negative obtained from the one housed in a photographic container and a short type negative obtained by dividing the long type negative into a unit of 4 frames or 6 frames. A negative holder shown in the following embodiment can hold the short type negative and the long type negative in one holder simultaneously.

As a material of a belt-shaped member, a film or a fiber may be used, and a conductive material is preferable. For that purpose, those containing conductive particles such as carbon black, those having therein conductive fibers, and those on which conductive materials are plated, coated or evaporated. The material which is hardly charged is preferable.

Conductivity used in the invention means electric conductivity of $10^{-15}$ $[\Omega^{-1} \cdot cm^{-1}]$ or more, and it is preferable that electric conductivity is not less than $10^{-13}$ $[\Omega^{-1} \cdot cm^{-1}]$ (especially, not less than $10^{-10}$ $[\Omega^{-1} \cdot cm^{-1}]$). Further, it is preferable that electric conductivity is not less than $10^{-7}$ $[\Omega^{-1} \cdot cm^{-1}]$ or more. Still further, it is preferable that electric conductivity is not less than $10^{-5}$ $[\Omega^{-1} \cdot cm^{-1}]$ or more.

Now, the electric conductivity in the present invention is explained. The electric conductivity is calculated by the following formula:

$$\rho = I/V \times d/S \ (\Omega^{-1} \cdot cm^{-1})$$

wherein S ($cm^2$) is an area of a cross section of a sample, d (cm) is a distance between electrodes in which the sample is placed, V (v) is an electric voltage applied to the electrodes and I (A) is an electric current on the the electrodes under the voltage.

As a type wherein a part of the guide comes in contact with the outermost circumference of the wound belt-shaped member taken up by the first roller, there are given some types such as a type wherein a total area of a tip of the guide comes in contact with the outermost circumference of the wound belt-shaped member taken up by the first roller, a type wherein a part of a tip of the guide (both ends of the tip or the center portion of the tip shown in the embodiment are given as an example) comes in contact with the outermost circumference of the wound belt-shaped member taken up by the first roller, and a type wherein an inside portion from the tip of the guide comes in contact with the outermost circumference of the wound belt-shaped member taken up by the first roller. From the viewpoint of preventing that the negative taken up and sandwiched between layers of the belt-shaped member is nipped undesirably between the guide and the outermost circumference of the belt-shaped member, the type wherein a total area or a part of a tip of the guide comes in contact with the outermost circumference of the wound belt-shaped member taken up by the first roller. It is preferable in terms of shape that both ends of a tip of the guide are slanted inside, portions where the both ends of a tip of the guide are slanted inside come in contact with the outermost circumference of the wound belt-shaped member taken up by the first roller, and the negative is guided by the portions slanted inside and thereby is peeled off the outermost circumference of the belt-shaped member.

In order to avoid the curling of photographic film, it may be preferable that a diameter of the first roller is not smaller than 20 mm.

Members to be detected which are provided on the belt-shaped member include, a member to be detected optically having reflection coefficient which is different from that of other portions of the belt-shaped member, a member to be detected optically such as the one having transmittance different from that of other portions of the belt-shaped member, a member to be detected magnetically for the magnetic detection, and a member to be detected mechanically such as a switch member for the mechanical detection.

The moving speed of the negative which is moved by a photographic processing means is the moving speed of the negative on the entrance side of the photographic processing means. For example, in the case where the photographic processing means has therein an image pickup means which picks up images from the negative and a printing means which prints on a light-sensitive material for printing from the negative made by the image pickup means, when the image pickup means is adjacent to the conveyance means and when the moving speed of the negative on the image pickup means is different from that on the printing means, the moving speed of the negative on the image pickup means corresponds to the moving speed of the negative which is moved by the photographic processing means.

DETAILED DESCRIPTION OF THE PREFERRED EMBODIMENT

As an embodiment of the invention, there will be shown as follows some concrete examples to which the invention is not limited. In the embodiment, there are some conclusive expressions in terms of terminology, but they indicate preferable examples of the invention, and they limit neither meaning of terminology nor technical scope of the invention.

Embodiment 1

Negative holders in the present embodiment are shown in FIGS. 1–10. The negative holder in the present embodiment is one capable of holding a large number of 135 type photographic films as a negative, and it holds negatives complying with plural orders. Incidentally, the 135 photographic film is a transmission type negative which is a photographic film obtained by processing an exposed silver halide photographic film. Further, the negative holder in the present embodiment can hold a color negative film, a color reversal film and even a black and white film. On each of these 135 photographic films, it is possible to record a plurality of image frames tandem, and plural image frames are usually recorded on each of the 135 photographic films. However, the 135 photographic films may be a mixture including a photographic film on which no image frame is recorded at all, a photographic film on which only one image frame is recorded, a sheet showing a distinction between orders, and a sheet on which no image frame is recorded at all but information of orders are recorded.

Judging from explanation of the present embodiment, it may be possible to divert to a negative holder which holds negatives obtained by processing each of a photographic film housed in a cartridge, a photographic film of a 120 or 220 standard, and a photographic film housed in an APS cartridge.

A negative holder in the present embodiment will be explained as follows. Each of FIGS. 1–4 is a diagram showing the negative holder in which no negatives are held, while each of FIGS. 6–9 is a diagram showing the negative holder in which the maximum quantity of negatives are held.

Figure 1:
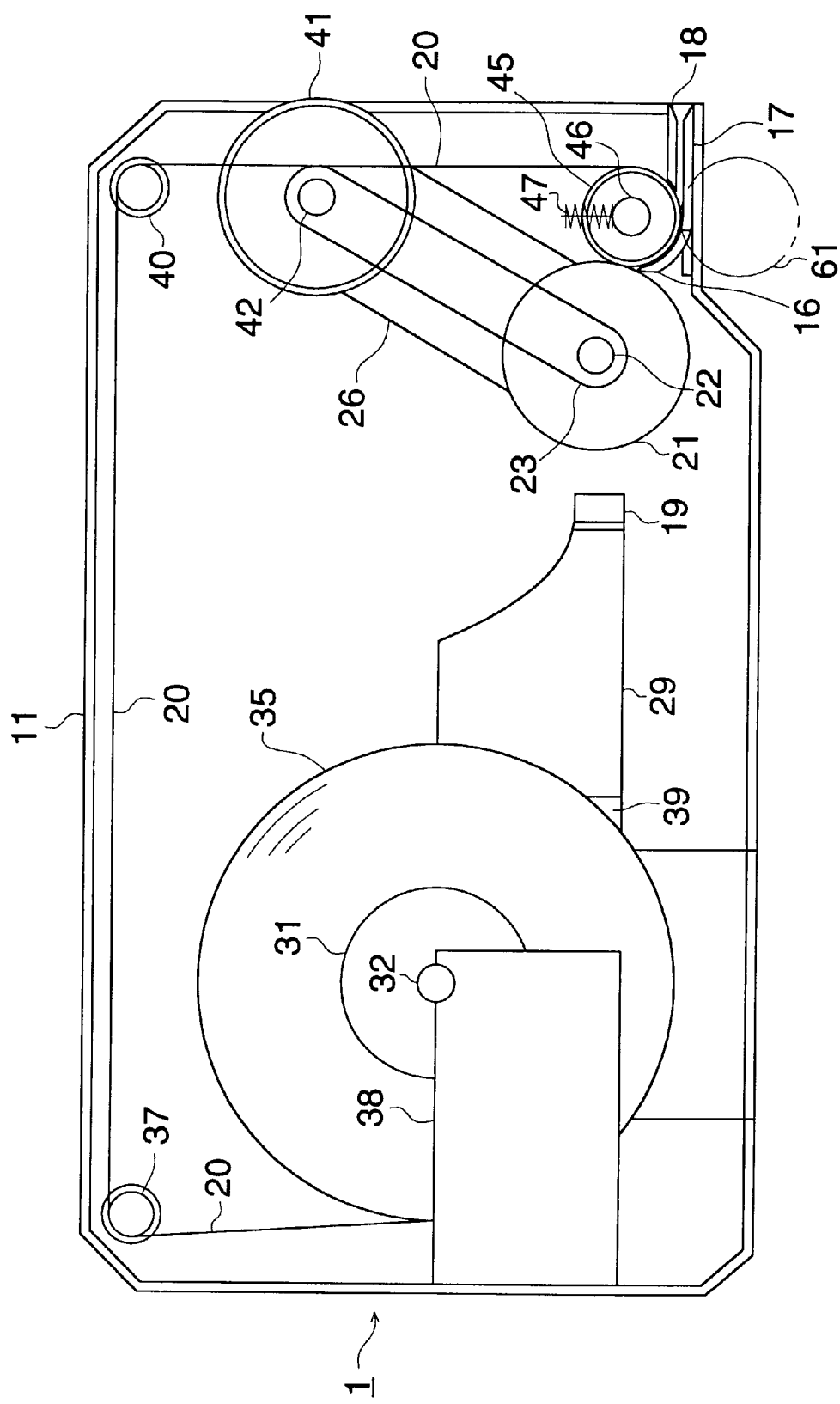
FIG. 1 is a front view of the inside of a negative holder in which negatives are not yet held in the first embodiment.
Figure 2:
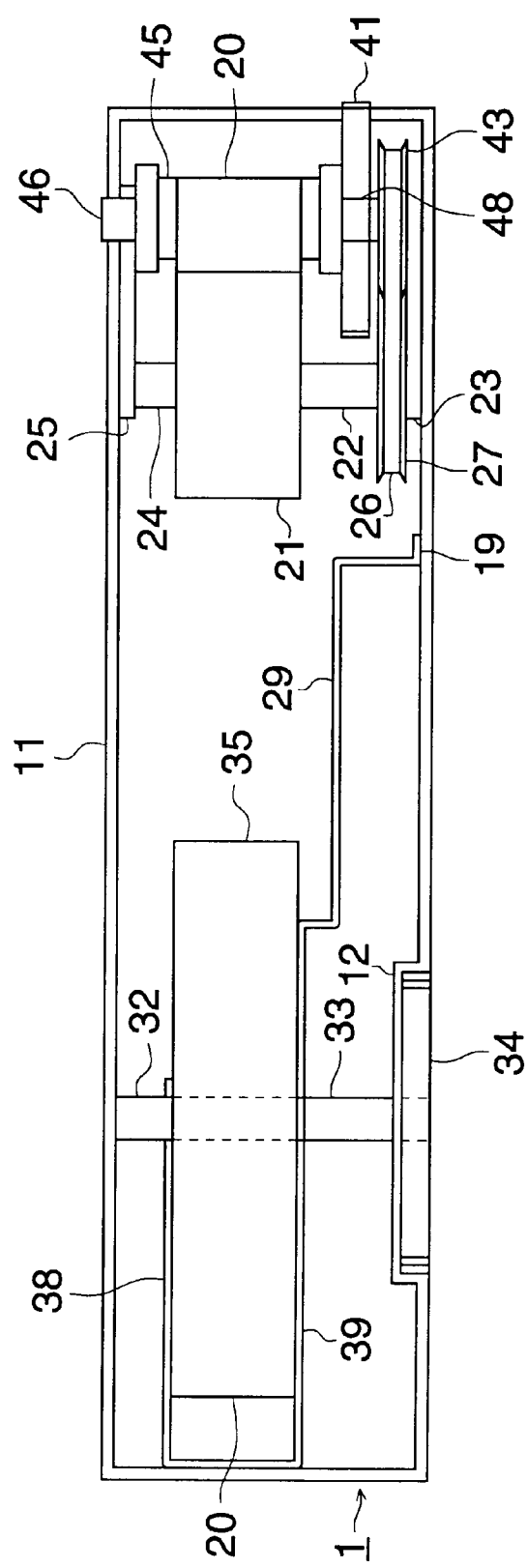
FIG. 2 is a bottom view of the inside of a negative holder in which negatives are not yet held in the first embodiment.
Figure 3:
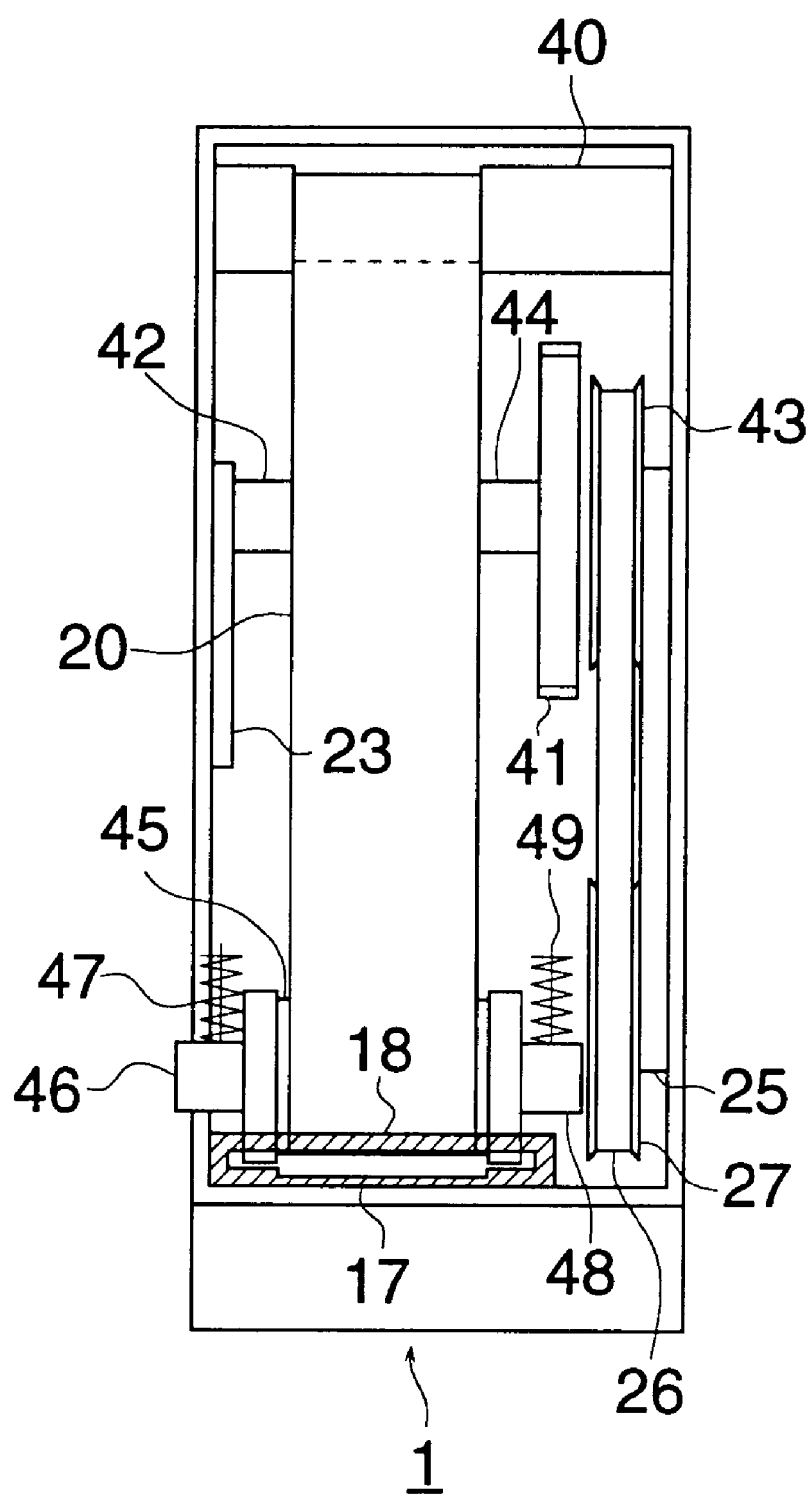
FIG. 3 is a side view of the inside of a negative holder in which negatives are not yet held in the first embodiment.
Figure 4:
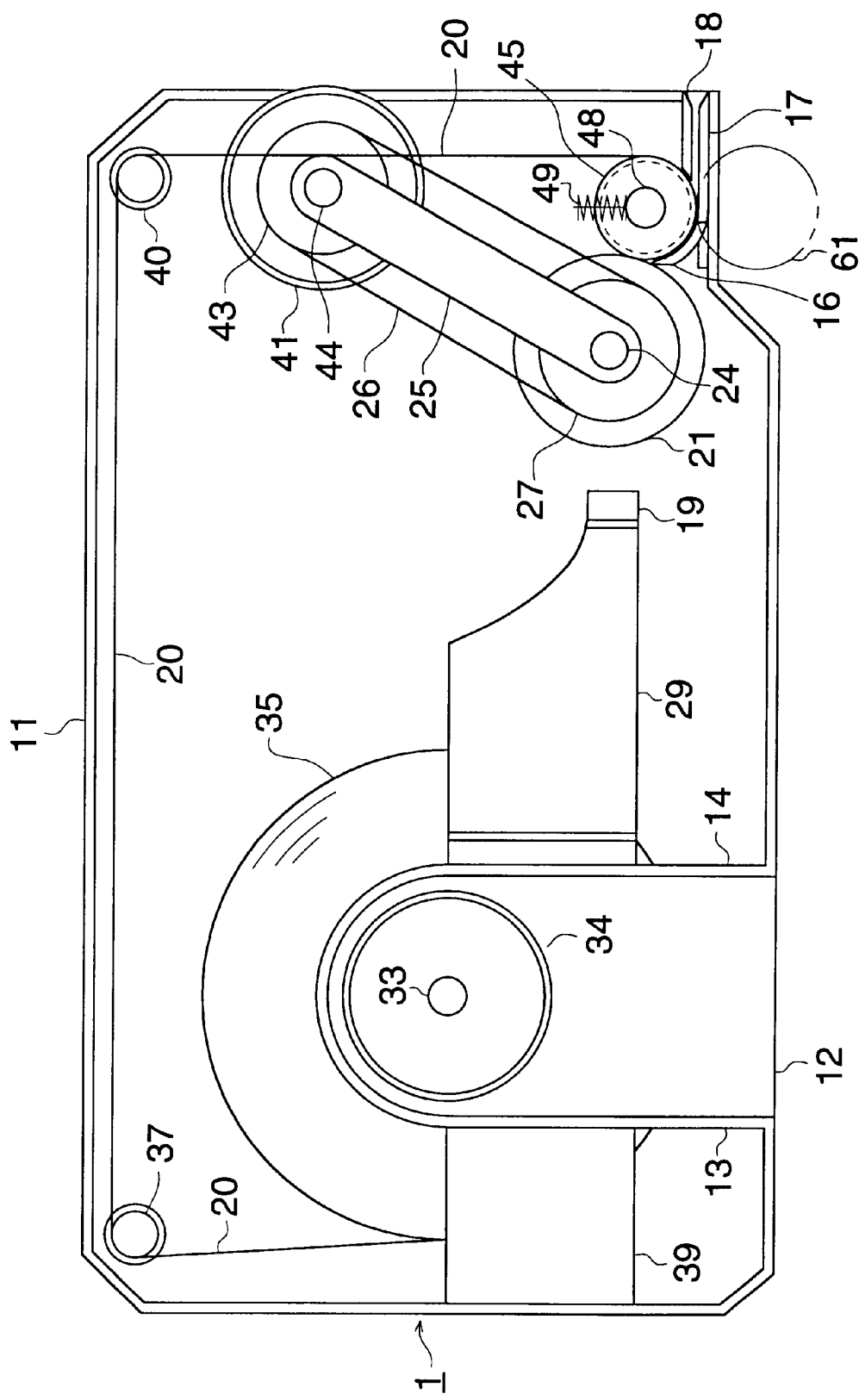
FIG. 4 is a rear view of the inside of a negative holder in which negatives are not yet held in the first embodiment.

First, the structure of the negative holder will be explained based on FIGS. 1–4 each showing the negative holder housing no negative holder. FIG. 1 is an internal front view showing the inside of the negative holder viewed from the front side. FIG. 2 is an internal bottom view showing the inside of the negative holder viewed from the bottom side, and FIG. 3 is an internal side view showing the inside of the negative holder viewed from the right side in FIG. 1. FIG. 4 is an internal rear view showing the inside of the negative holder viewed from the rear side in FIG. 1. Based on these figures, the explanation will be given as follows. Incidentally, the actual front side, bottom side, flank side and rear side are covered by a front panel of negative holder main body 11, and the internal structure can not be observed accordingly. The negative holder main body 11 is formed with a plastic material containing carbon blacks, and has conductivity of not less than $10^{-5}$ [$\Omega^{-1}\cdot cm^{-1}$].

The first roller 21 is a roller to take up belt-shaped member 20 by holding one end of the belt-shaped member 20. The first roller 21 is made of a plastic material containing carbon blacks, and has conductivity of not less than $10^{-5}$ [$\Omega^{-1}\cdot cm^{-1}$]. The first roller 21 is provided on its center with a cylindrical shaft passing therethrough, and the cylindrical shaft is provided on its front side with protruded shaft 22 and on its back side with protruded shaft 24 (FIG. 2). The shaft 22 on the first roller 21 is engaged rotatably with a hole made on one end of front arm 23 (FIG. 1). The shaft 24 on the first roller 21 is engaged rotatably with a hole made on one end of rear arm 25 (FIG. 4). Wheel 27 for a power transmission belt is fixed around the shaft 22 on the first roller 21 so that the wheel 27 for a power transmission belt may be rotated solidly together with the first roller 21 (FIG. 4). One end of power transmission belt 26 is wound around the wheel 27 for a power transmission belt (FIG. 4).

Incidentally, the belt-shaped member 20 is a long belt-shaped member having a constant width, and its one end is supported by the first roller 21 in a way that the axial direction of the first roller 21 is perpendicular to the longitudinal direction of the belt-shaped member 20 and the lateral direction of the belt-shaped member 20 and the axial direction of the first roller 21 are horizontal.

First roller drive gear 41 is a gear which receives driving force from an external drive source and drives the first roller 21. The first roller drive gear 41 is provided on its center with a cylindrical shaft passing therethrough, and the cylindrical shaft is provided on its front side with protruded shaft 42 and on its back side with protruded shaft 44 (FIG. 3). 22 and on its back side with protruded shaft 24 (FIG. 2). The shaft 42 on the first roller drive gear 41 is engaged rotatably with a hole made on one end of front arm 23 (FIG. 1). The shaft 44 on the first roller drive gear 41 is engaged rotatably with a hole made on one end of rear arm 25 (FIG. 4). Wheel 43 that is for a power transmission belt is fixed around the shaft 44 on the first roller drive gear 41 so that the wheel 43 for a power transmission belt may be rotated solidly together with the first roller drive gear 41 (FIG. 4). One end of power transmission belt 26 is wound around the wheel 43 for a power transmission belt (FIG. 4). A front end of the shaft 42 of the first roller drive gear 41 is supported rotatably by negative holder main body 11, while a rear end of the shaft 44 of the first roller drive gear 41 is supported rotatably by a hole (not shown) made on the negative holder 11 through an unillustrated torque limiter. Thus, the front arm 23, the rear arm 24 and the first roller 21 that is supported by both the front arm 23 and the rear arm 24 can be rotated on the axes of the shafts 42 and 44. Since the rear end of the shaft 44 of the first roller drive gear 41 is supported rotatably by a hole (not shown) made on the negative holder 11 through an unillustrated torque limiter, it is prevented that the first roller drive gear 41 and the first roller 21 are rotated by their vibrations, resulting in that the belt-shaped member 20 wound around the first roller 21 is rewound to be slackened. The front arm 23 and the rear arm 24 are urged respectively by coil springs (not shown) provided respectively on the shafts 42 and 44 in the direction in which the first roller 21 comes in contact with third roller 45.

As a structure to transmit a driving force from the firs roller driving gear to the first roller in addition to the above structure, a structure in which a driving gear to drive a center axis of the first roller is provided may be used. By rotating the driving gear, a driving force is transmitted directly to the first roller. With this structure, the apparatus can be made more compact.

When taking up a negative together with the belt-shaped member 20 to be taken up with the first roller 21 as a center from the status shown in FIGS. 1–4 where no negatives are held, the negative is guided by the front arm 23 that supports a front side of the first roller 21, the rear arm 25 that supports a rear side thereof and guide 29 that supports the rear side thereof.

Second roller 31 is a roller which holds one end of a belt-shaped member and takes it up to accumulate. The second roller 31 is formed with a plastic material containing carbon blacks, and has conductivity of not less than $10^{-5}$ [$\Omega^{-1}\cdot cm^{-1}$]. The second roller 31 is provided on its center with a cylindrical shaft passing therethrough, and the cylindrical shaft is provided on its front side with protruded shaft 32 and on its back side with protruded shaft 33 (FIG. 2). The shaft 33 on the second roller 31 is supported rotatably by a hole made on recessed portion 12 of the negative holder main body 11. The shaft 32 of the second roller 31 is supported rotatably by a hole (not shown) made on the negative holder main body 11 through an unillustrated torque limiter, Thus, second roller 31 is prevented from rotation caused by its vibration, resulting in that the belt-shaped member 20 wound around the second roller 31 is rewound to be slackened. The shaft 33 of the second roller 31 passes through the recessed portion 12 of the negative holder 11 to fix thereon power transmission gear 34 solidly, so that the power transmission gear 34 may be rotated solidly with the second roller 31 (FIG. 4).

In the state where no negatives are held as shown in FIGS. 1–4, scroll 35 of the belt-shaped member 20 whose shaft is represented by the second roller 31 is formed, and thereby the belt-shaped member 20 is accumulated. Namely, the accumulating section is formed. Incidentally, in this case, telescoping (telescoped roll) which may be caused when forming the scroll 35 is prevented by guide 38 that supports a front side of the scroll 35 and guide 39 that supports a rear side thereof.

The third roller 45 is a roller to support a belt-shaped member in a way that the belt-shaped member can pass through the roller freely, and the belt-shaped member is taken up through an S-shaped path (the figure shows a reversed-S-shaped path which, however, is an S-shaped path when viewed from the opposite direction). The third roller 31 is made of metal (stainless steel) and it has conductivity of not less than 1 [$\Omega^{-1} \cdot cm^{-1}$]. The third roller 45 is provided on its center with a cylindrical shaft passing therethrough, and the cylindrical shaft is provided on its front side with protruded shaft 46 and on its back side with protruded shaft 48 (FIG. 2). The shafts 46 and 48 on the third roller 45 are supported rotatably in a hole (not shown) made on the negative holder main body 11. The shafts 46 and 48 on the third roller 45 can be moved vertically, and they are urged downward (toward nip roll 61 at the apparatus side) in FIGS. 1 and 4 respectively by predetermined force of nip springs 47 and 49. These are for nipping a negative with predetermined force. (It is difficult for the roller to transmit predetermined drive power while being capable of being moved vertically for the purpose that the roller on the side for transmitting drive power nips with predetermined force,) Incidentally, since the third roller 45 is rotated by a belt-shaped member when it passes through the third roller, there is especially selected a material which causes small friction between the shafts 46 and 48 on the third roller 45 and the negative holder main body 11 which is pressed by the shafts 46 and 48 through the nip springs 47 and 48.

The belt-shaped member 20 is made of fiber containing conductive particles (carbon blacks, metallic particles) and it has conductivity of not less than $10^{-5}$ [$\Omega^{-1} \cdot cm^{-1}$] accordingly. One end of the belt-shaped member is held by the first roller 21 and the other end is held by the second roller 31. A portion between both ends of the belt-shaped member is trained about metallic roller 37, metallic roller 40 and the third roller 45. Since the belt-shaped member is supported by the metallic rollers 37 and 40 which represent a metallic roller, the third roller 45, and by the conductive first roller 21 and second roller 31, the belt-shaped member is hardly charged, and sticking of a negative to the belt-shaped member 20 caused by charging, and discharge are prevented. Each of metallic rollers 37 and 40 is provided with a guide groove having the same width as that of the belt-shaped member 20 as shown in FIG. 3, friction between the metallic roller and the belt-shaped member 20 is small, and the metallic rollers are fixed on the negative holder main body 11.

The belt-shaped member 20 is provided thereon with a mark to detect the state wherein negatives in prescribed quantity which is the same or greater than the maximum quantity corresponding to one order (quantity necessary to cover a long type negative in the maximum length corresponding to one order, or a quantity necessary to cover plural short type negatives corresponding to one order at intervals, whichever is greater) can be held. This mark is a silver mark which is highly reflective, and portions other than this mark on this belt-shaped member 20 are formed to be black which is less reflective so that the detecting power may be improved.

Guide 29, guide 39 and guide 38 are formed solidly with a folded metal sheet, and joint portion 19 thereof is jointed with a rear face of the negative holder main body 11 and a folded portion between the guide 39 and guide 38 is jointed with the side (surface on the left side in FIGS. 1 and 4) of the negative holder main body 11.

In holder 1, negative 70 is pinched between the outermost circumference of the belt-shaped member 20 taken up by the first roller 21 and the belt-shaped member 20 taken up by the first roller 21, and then the negative 70 is taken up and held when the first roller 21 rolls in the belt-shaped member 20. Mechanism for the operations mentioned above will be explained as follows, referring to FIG. 5 which is a partially enlarged diagram of the holder. The third roller 45 is provided with a guide groove having the same width as that of the negative 70 so that the negative may be kept constant in terms of its lateral position when it is conveyed. The first roller 21 and the third roller 45 are arranged in a way that their axial directions are in parallel each other so that the belt-shaped member 20 passing through the third roller may be taken up on the first roller 21 without being twisted.

Figure 10:
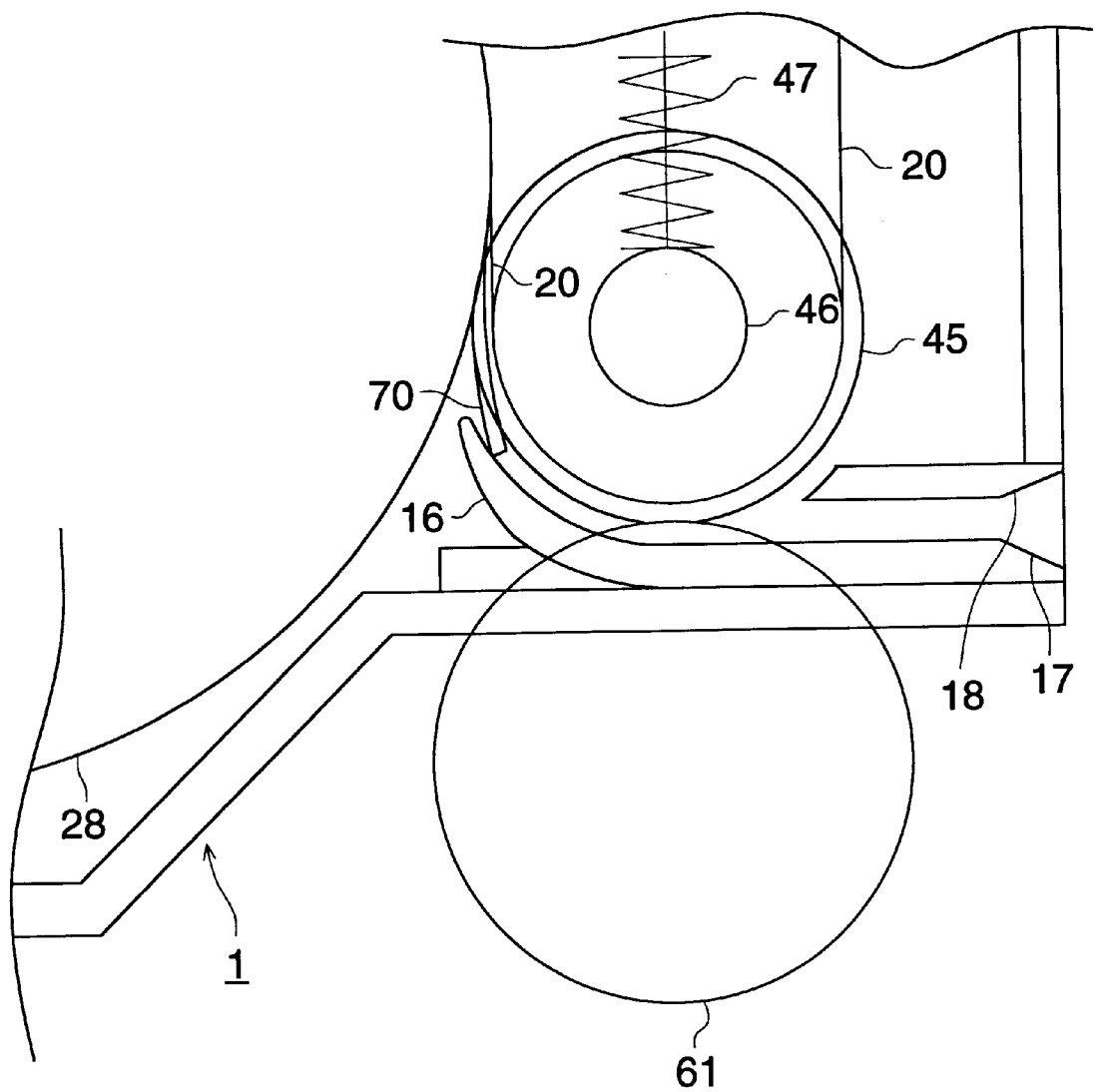
FIG. 10 is a partially enlarged view of a negative holder in which maximum quantity of negatives are held in the first embodiment.

Guide 16 guides the negative 70 toward pinching position, having its guiding surface for negative 70 that follows the third roller 45. In the holder 1, negative 70 taken up and held is fed out when the belt-shaped member 20 taken up by the first roller 21 is rewound as shown in FIG. 10, and the negative 70 to be fed out is guided by this guide 16 toward the exit. This can be achieved because the pinching position where the negative 70 is pinched between the outermost circumference of the belt-shaped member 20 taken up by the first roller 21 and the belt-shaped member 20 to be taken up by the first roller 21 is almost constant.

Figure 5:
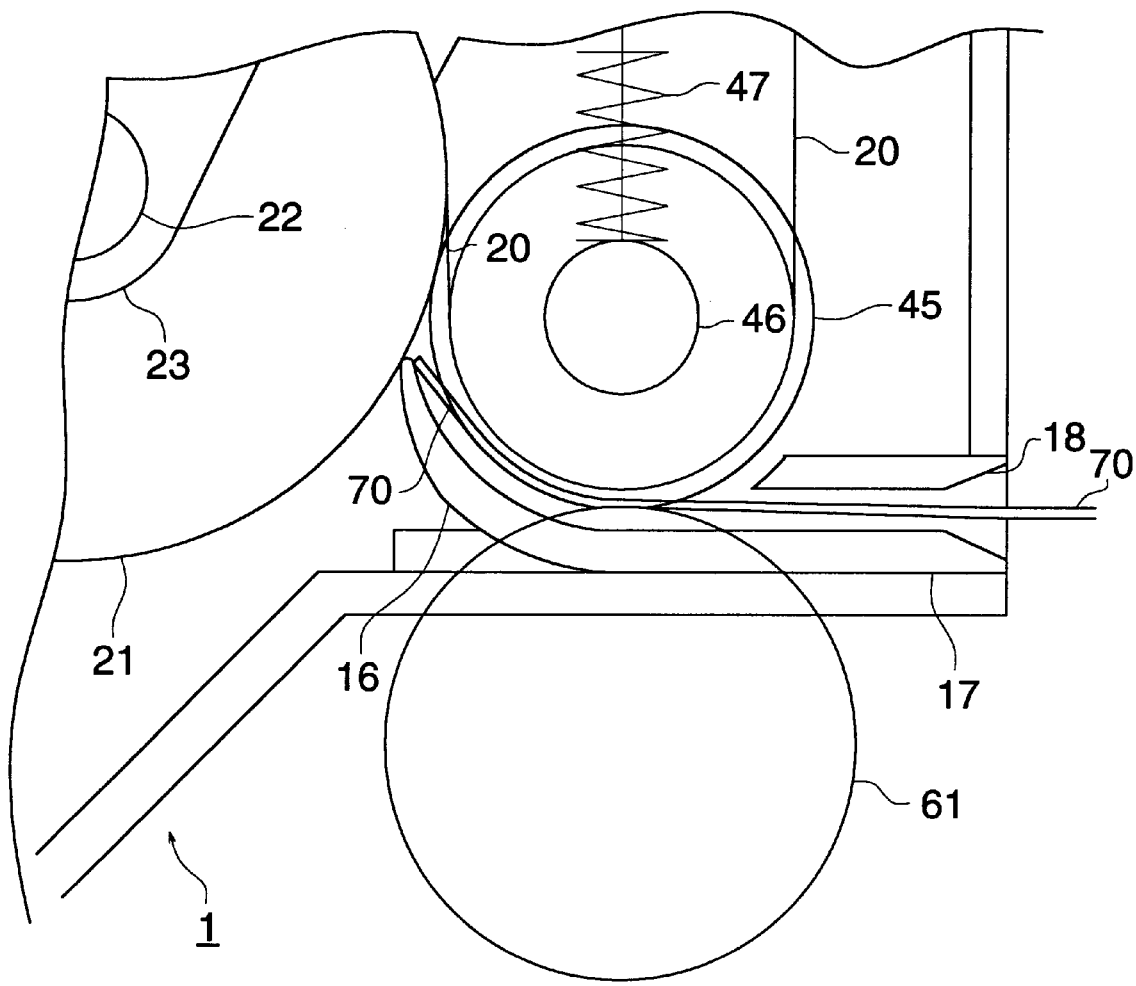
FIG. 5 is a partially enlarged view of a negative holder in which negatives are not yet held in the first embodiment.
Figure 6:
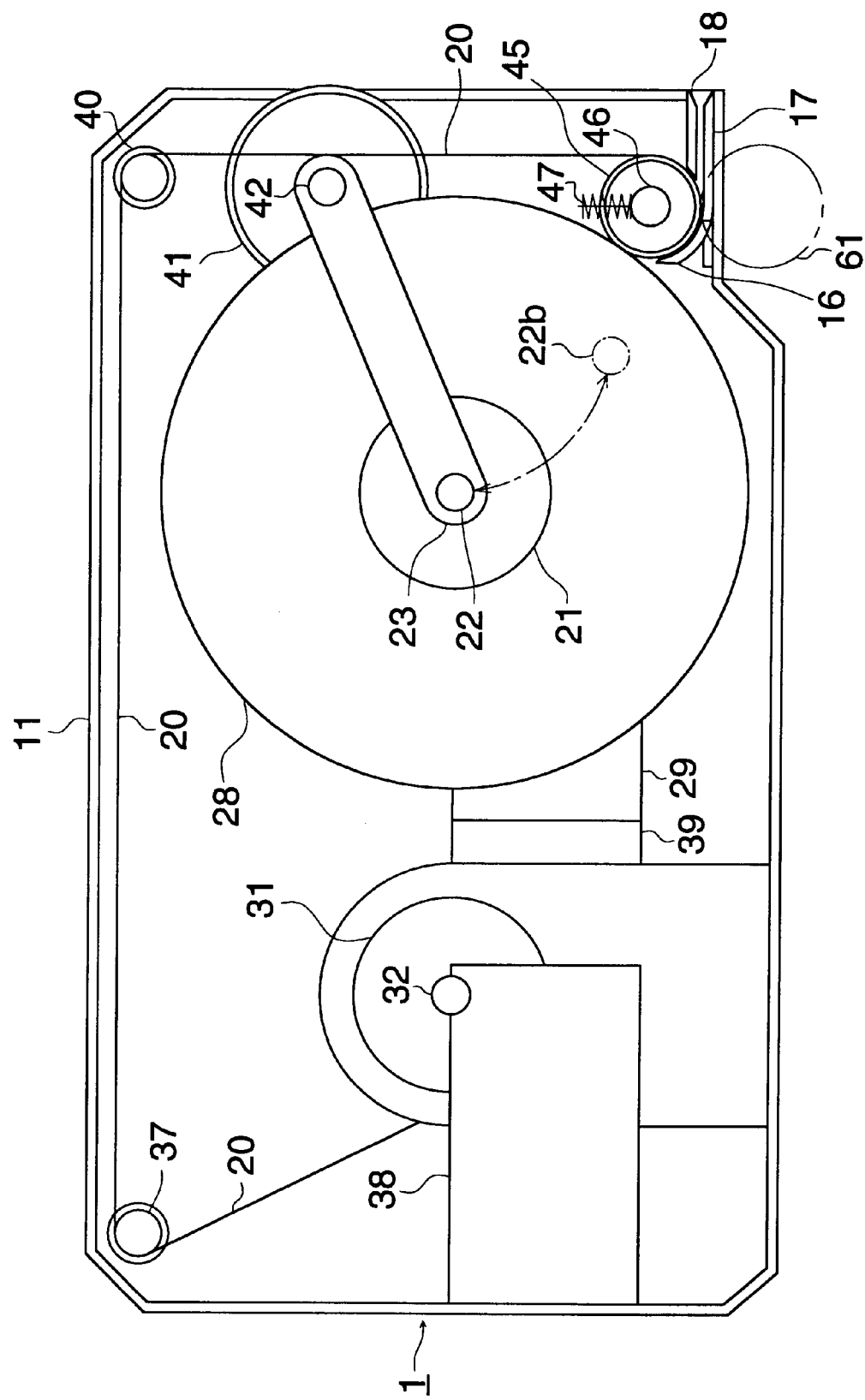
FIG. 6 is a front view of the inside of a negative holder in which maximum quantity of negatives are held in the first embodiment.
Figure 7:
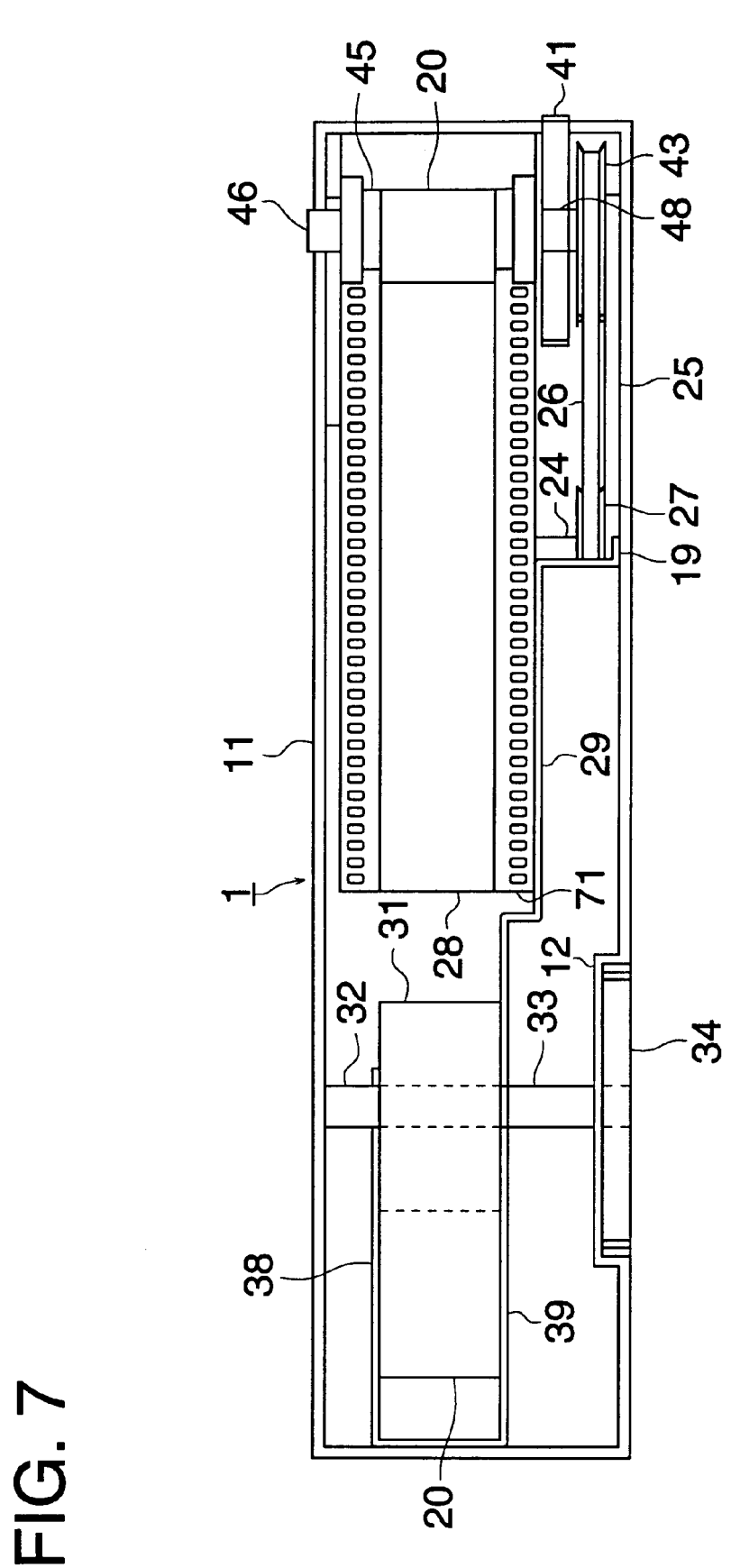
FIG. 7 is a bottom view of the inside of a negative holder in which maximum quantity of negatives are held in the first embodiment.
Figure 8:
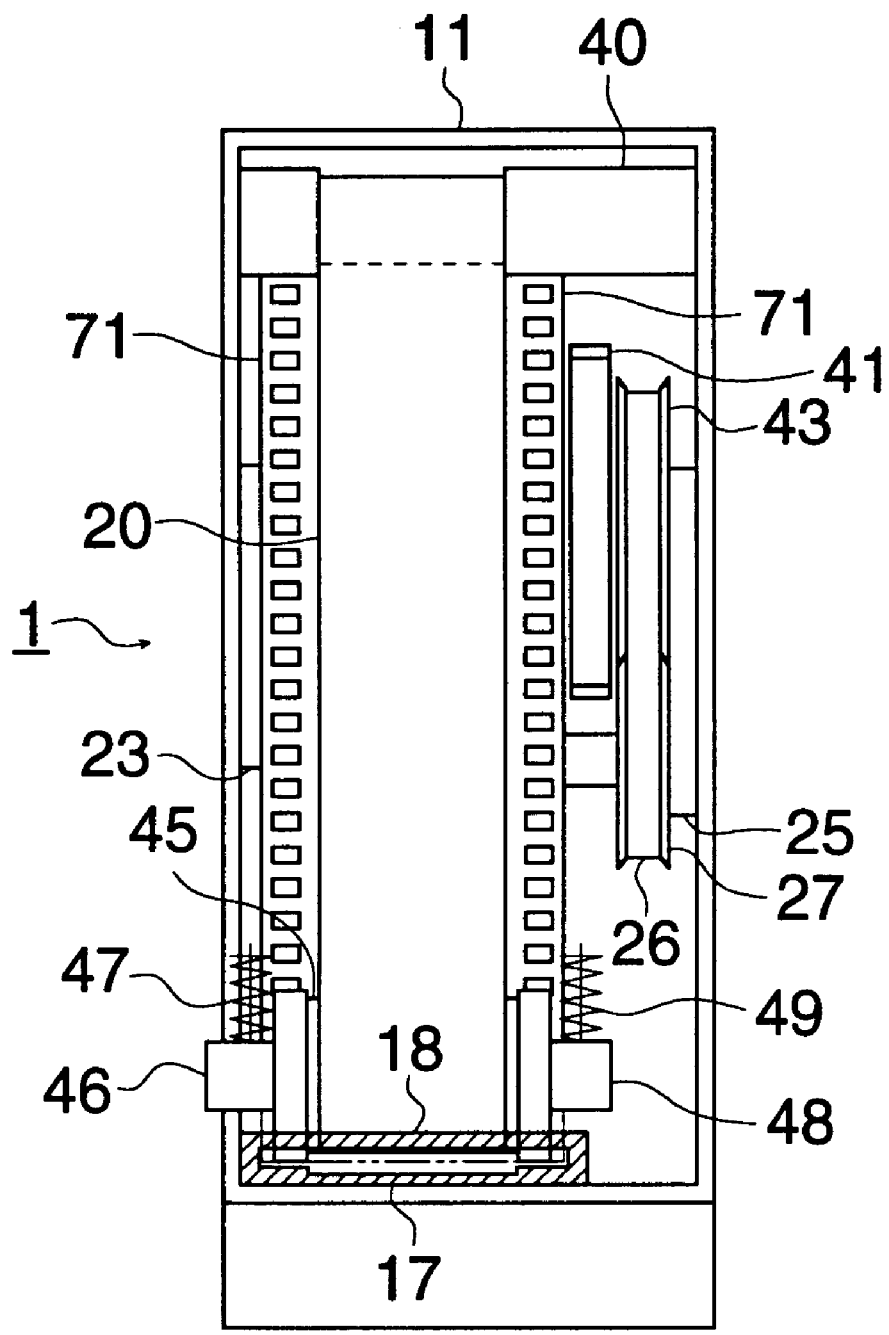
FIG. 8 is a side view of the inside of a negative holder in which maximum quantity of negatives are held in the first embodiment.
Figure 9:
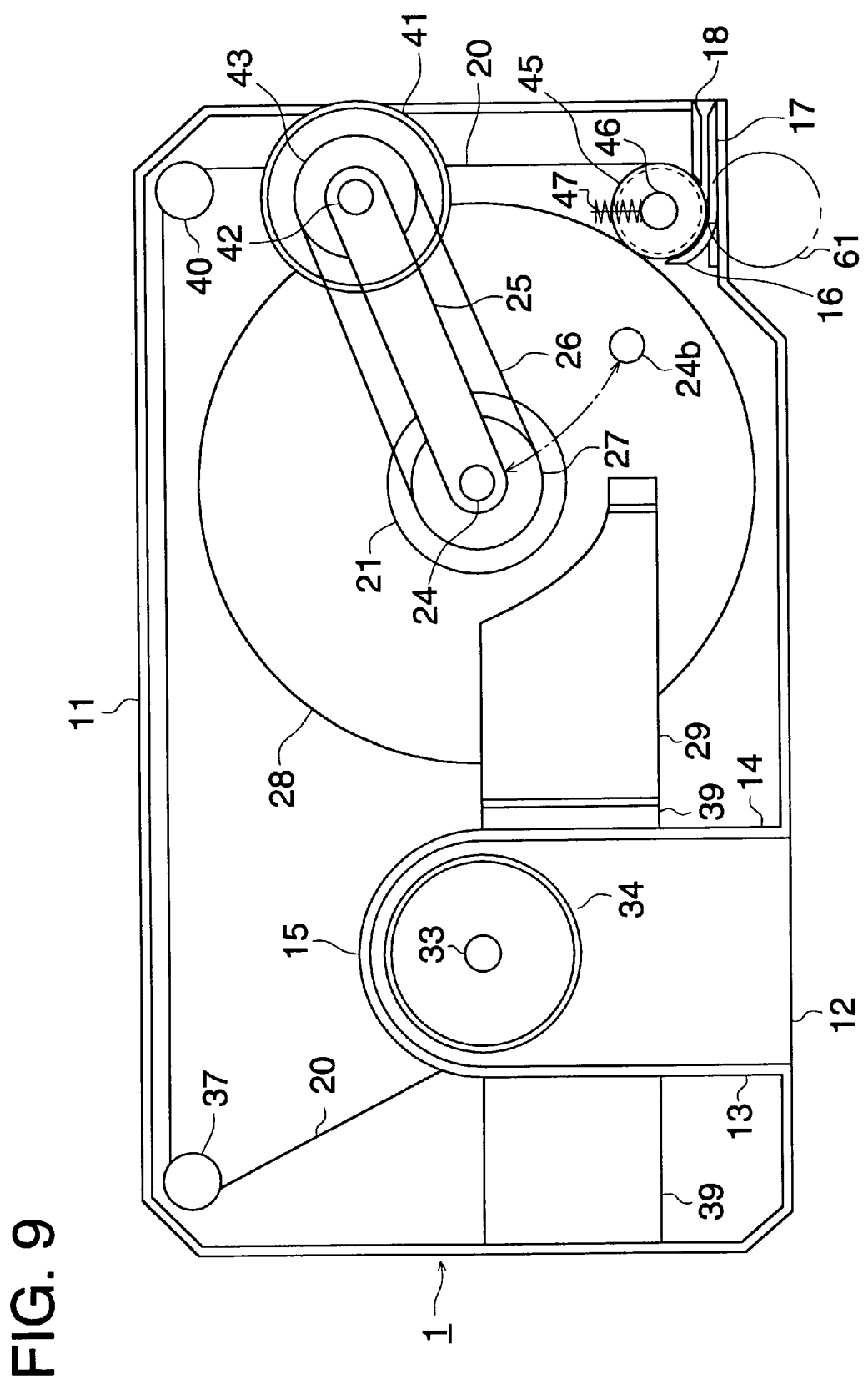
FIG. 9 is a rear view of the inside of a negative holder in which maximum quantity of negatives are held in the first embodiment.

Next, the state wherein the maximum quantity of negatives are held will be explained, referring to FIGS. 6–9. Under this state, the belt-shaped member 20 is taken up by the first roller 21 to form scroll 28. The first roller 21 supported by front arm 23 and rear arm 24 is arranged to be capable of rotating on the center of shafts 42 and 44, the first roller 21 is urged in the direction to come in contact with third roller 45, and shaft 22 and the first roller 21 move to the position shown in the figure from shaft position 22b in the state where no negatives are held as shown with an arrow. Thus, the pinching position 10 where the negative 70 is pinched between the outermost circumference of the belt-shaped member 20 taken up by the first roller 21 and the belt-shaped member 20 to be taken up by the first roller 21 can be almost constant. (though the pinching position 10 in FIG. 5 is slightly different from that in FIG. 10, a difference in such extent is included in "the pinching position is almost constant" in the invention.)

Since the first roller 21 supported by both front arm 23 and rear arm 24 rotates on the center of shafts 42 and 44, guide 29 is formed to be recessed to avoid the path for the first roller 21. Under the state wherein the maximum quantity of negatives are held, the belt-shaped members are not accumulated, and the second roller 31 is open to the view.

Figure 11:
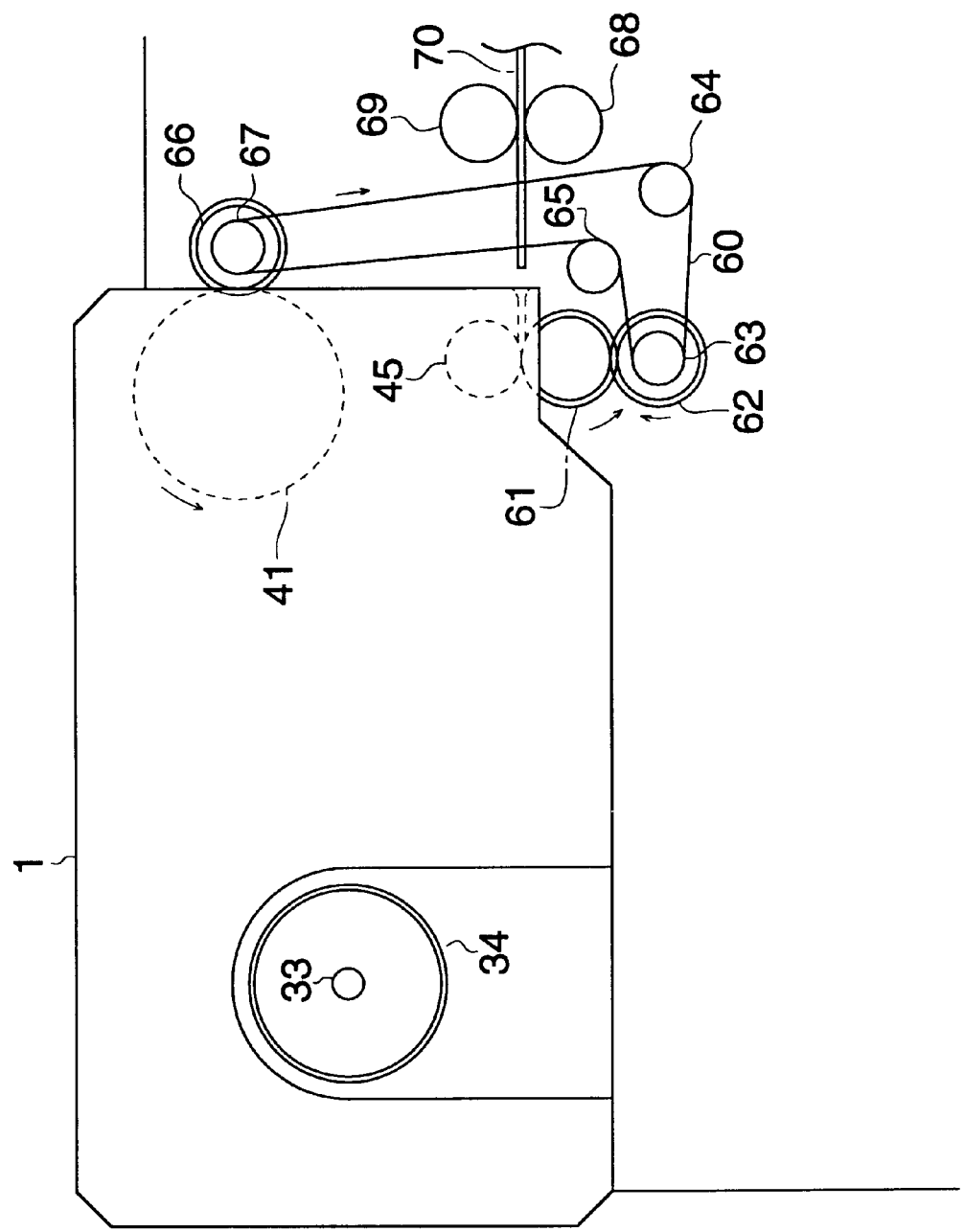
FIG. 11 is a schematic structural diagram of a mechanism for holding negatives in the negative holder in the first embodiment.

Next, a mechanism to hold negative 70 in negative holder 1 will be explained. A mechanism to hold negative 70 in negative holder is attached to an apparatus provided with a device to handle, in a succeeding step, the negatives held, such as an automatic processing machine for processing light-sensitive films, or an automatic printing machine which is followed by a packing machine in the succeeding step. FIG. 11 shows a schematic structure diagram of the mechanism to hold negative 70 in negative holder 1.

When the negative holder 1 is set at the prescribed position on the device, driving gear 66 engages with first roller drive gear 41, and nip roll 61 on the device shifts the position of third roller 45 upward against the force of nip springs 47 and 48. Accordingly, the nip roll 61 on the device receives the driving force even from the third roller 45. Incidentally, power transmission gear 34 is in the state of free.

An unillustrated drive motor which is a driving source in the mechanism is connected to the driving gear 66. The driving gear 66 rotates the first roller drive gear 41 in the arrowed direction in FIG. 11, thus, belt-shaped member 20 is taken up to be wound around the first roller 21. In addition, there is provided drive wheel 67 which is fixed on the driving gear 66 on a coaxial basis.

Further, reversal gear 62 is engaged with the nip roll 61 on the device. Between reversal gear wheel 63 provided to be coaxial with the reversal gear 62 and the reversal gear 62, there is provided a one-way clutch, and when the rotational speed of the reversal gear 62 is lower than that of the reversal gear wheel 63, there is caused a slip between the reversal gear 62 and the reversal gear wheel 63.

Belt 60 is trained about the reversal gear wheel 63 and driving wheel 67. The belt 60 is supported rotatably by guide rolls 64 and 65 in a manner that the belt is stretched while having a prescribed tension for rotation.

When the negative 70 is to be fed in by conveyance drive rollers 68 and 69 which are for feeding in negative 70 as shown in FIG. 11, the drive motor rotates the driving gear 66 and others in the illustrated direction to hold the negative 70 in the negative holder 1.

Incidentally, since the conveyance speed of the conveyance drive rollers 68 and 69 (corresponding to a conveyance means for conveying a negative to a negative holder) for the negative 70 is not higher than the lowest speed of the take-up speed at which the negative holder 1 takes up the negative 70, the conveyance speed of the conveyance drive rollers 68 and 69 for the negative 70 is constantly not higher than the take-up speed at which the negative holder 1 takes up the negative 70. Therefore, it is prevented that the negative 70 is folded in the place between the conveyance drive rollers 68 and 69 and the negative holder 1. Incidentally, the take-up speed at which the negative holder 1 takes up the negative 70 is a speed of a negative taken up by belt-shaped member 20 that is taken up by the first roller 21, which is mostly the same as the take-up speed of he belt-shaped member 20 taken up by the first roller 21. In the present embodiment, the third roller 45 that rotates corresponding to the belt-shaped member 20 taken up by the first roller 21 and the nip roll 61 on the device also rotate at this take-up speed.

In the manner mentioned above, a large number of negatives are held in succession. When a mark provided on belt-shaped member 20 is detected by an unillustrated photo-sensor, the state is recognized to be unable to hold, in the negative holder, a prescribed quantity of negatives which is not less than the maximum quantity corresponding to one order. Then, when negatives belonging to another order are attempted to be fed in, if it is possible to hold the prescribed quantity of negatives, the negatives are held, while if it is not possible to hold the prescribed quantity of negatives, the negatives are not held. Incidentally, the prescribed quantity is not less than the quantity, a quantity to cover a long type negative in the maximum length (39-exposure photographic film) or, a quantity necessary to cover all short type negatives belonging to one order requiring the longest path, whichever greater.

With regard to the number of negatives belonging to one order, the number represents one roll when the negative is a long type one, but the number is plural when the negative is a short type one. In the present embodiment, however, negatives belonging to one order are all held in one negative holder. For that reason, the mechanism mentioned above is required. Due to the arrangement described above, it is possible to hold as many negatives as possible in a negative holder, by holding the negatives belonging to one order in one negative holder without holding them in a different holder, regardless of orders.

Next, there will be explained a mechanism to take out negatives 70 which are held in negative holder 1. The mechanism to take out negatives 70 which are held in negative holder 1 is provided on an apparatus wherein negatives held in the negative holder 1 are handled in the preceding step, such as an automatic printing machine or a packing machine. The negative holder 1 is loaded in an apparatus corresponding to an apparatus for the preceding step. For example, when an apparatus for the preceding step is an automatic processing machine or a negative take-out device, it is considered that the negative holder is loaded in the automatic printing machine for printing which prints on a light-sensitive material from the negative, or in an image pickup apparatus that picks up images from the negative, and when an apparatus for the preceding step is an automatic printing machine or an image pickup apparatus, it is considered that the negative holder is loaded in a packing machine or in a holding device which holds negatives in a negative sheet.

Figure 12:
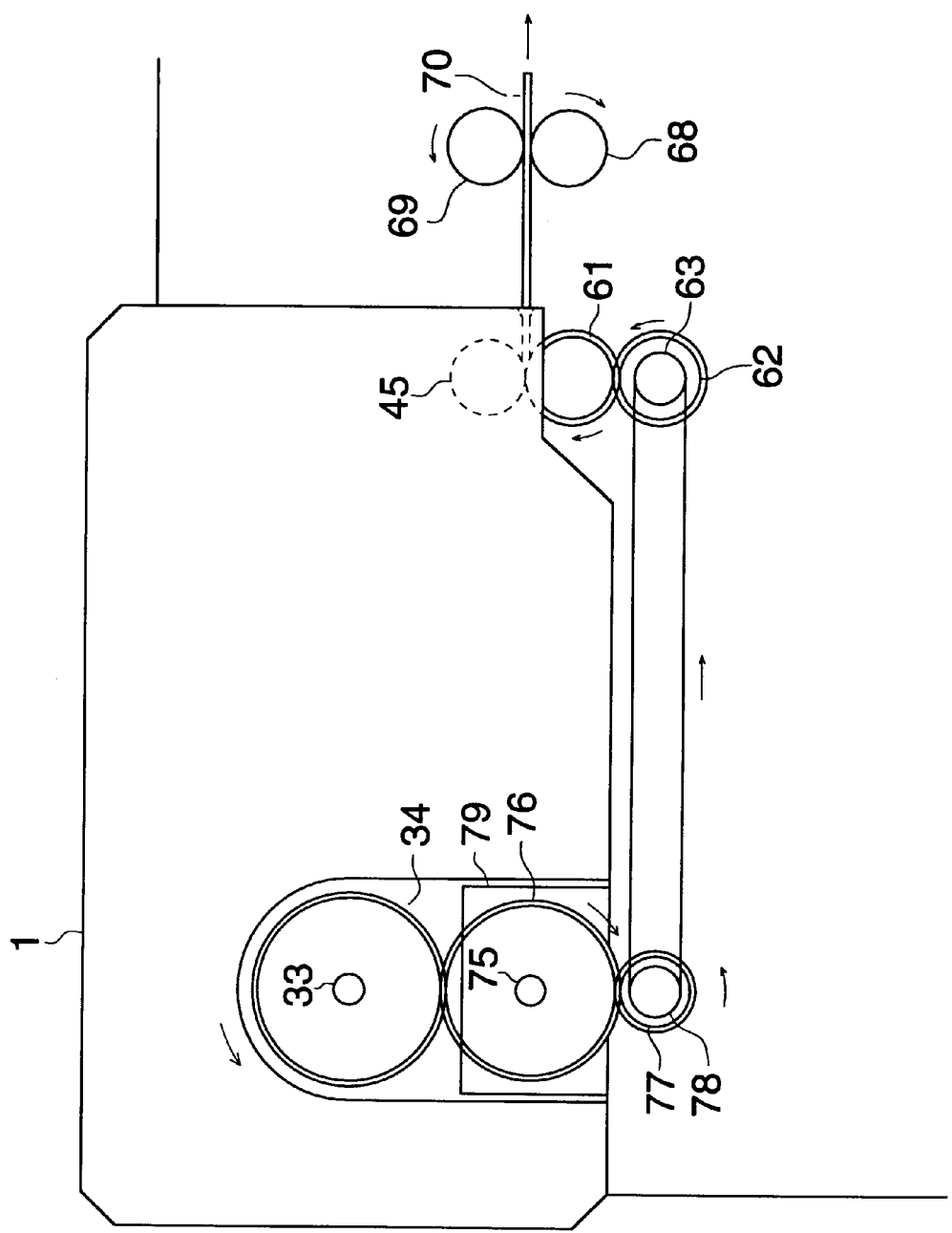
FIG. 12 is a schematic structural diagram of a mechanism for taking out negatives held in the negative holder in the first embodiment.

FIG. 12 is a schematic structure diagram of a mechanism which takes out the negative 70 held in negative holder 1.

When the negative holder 1 is set at a prescribed setting position on an apparatus, protrusion 79 on the apparatus is inserted in recessed portion 12 of negative holder main body 11, and thereby power transmission gear 76 provided on the protrusion 79 on the apparatus is engaged with power transmission gear 34. Further, the nip roll 61 on the device shifts the position of third roller 45 upward in FIG. 12 against the force of nip springs 47 and 48. Incidentally, first roller drive gear 41 is in the state of free.

An unillustrated drive motor which is a driving source in the mechanism is connected to driving gear 62. The driving gear 66 rotates nip roll 61 on the apparatus in the arrowed direction in FIG. 11, thus, belt-shaped member 20 is rewound from the first roller 21, and thereby negative 70 held on the belt-shaped member is fed out. In addition, there is provided drive wheel 67 which is fixed on the driving gear 66 on a coaxial basis.

Further, reversal gear 77 is engaged with the power transmission gear 76. Between reversal gear wheel 78 provided to be coaxial with the reversal gear 77 and the reversal gear 77, there is provided a one-way clutch, and when the rotational speed of the reversal gear 77 is lower than that of the reversal gear wheel 78, there is caused a slip between the reversal gear 77 and the reversal gear wheel 78. Belt 60 is trained about the reversal gear wheel 78 and drive wheel 67.

When the drive motor rotates drive gear 66 and others in the rotational direction in the figure to take out negative 70 from negative holder 1, the negative 70 is fed out by conveyance drive rollers 68 and 69 which feed out negative 70 as shown in FIG. 12. In this case, the feed-out speed for the negative 70 which is fed out of the negative holder 1 by the third roller rotated by nip roll 61 on the apparatus and nip roll 61 on the apparatus (a negative holder corresponds to a drive means to drive for feeding out the negative) is not stabilized due to inconstant speed rotation of the third roller 45 rotated by nip roll 61 on the apparatus and others, but it is within a speed range of a certain level. The conveyance speed for the negative 70 by the conveyance drive rollers 68 and 69 (corresponding to a conveyance means which conveys the negative which has been fed out of the negative holder by the drive means) is set to be not lower than the maximum feed-out speed for the negative 70 that is fed out of the negative holder 1 by the third roller 45 rotated by nip roll 61 on the apparatus and nip roll 61 on the apparatus (corresponding to a drive means to drive so that a negative holder may feed out the negative). Therefore, the conveyance speed for the negative 70 by the conveyance drive rollers 68 and 69 is always higher than the feed-out speed for the negative 70 to be fed out of the negative holder 1 by the third roller 45 rotated by nip roll 61 on the apparatus and nip roll 61 on the apparatus. Accordingly, it is prevented that the negative 70 fed out of the negative holder 1 is folded in the place between the negative holder 1 and the conveyance drive rollers 68 and 69.

Thus, it is possible to feed out negatives in the order opposite to that in which a large number of negatives were held in succession. Incidentally, when negatives are held, their order is not disturbed because they are pinched and fixed between belt-shaped members 20 by tension thereof for taking up.

Figure 13:
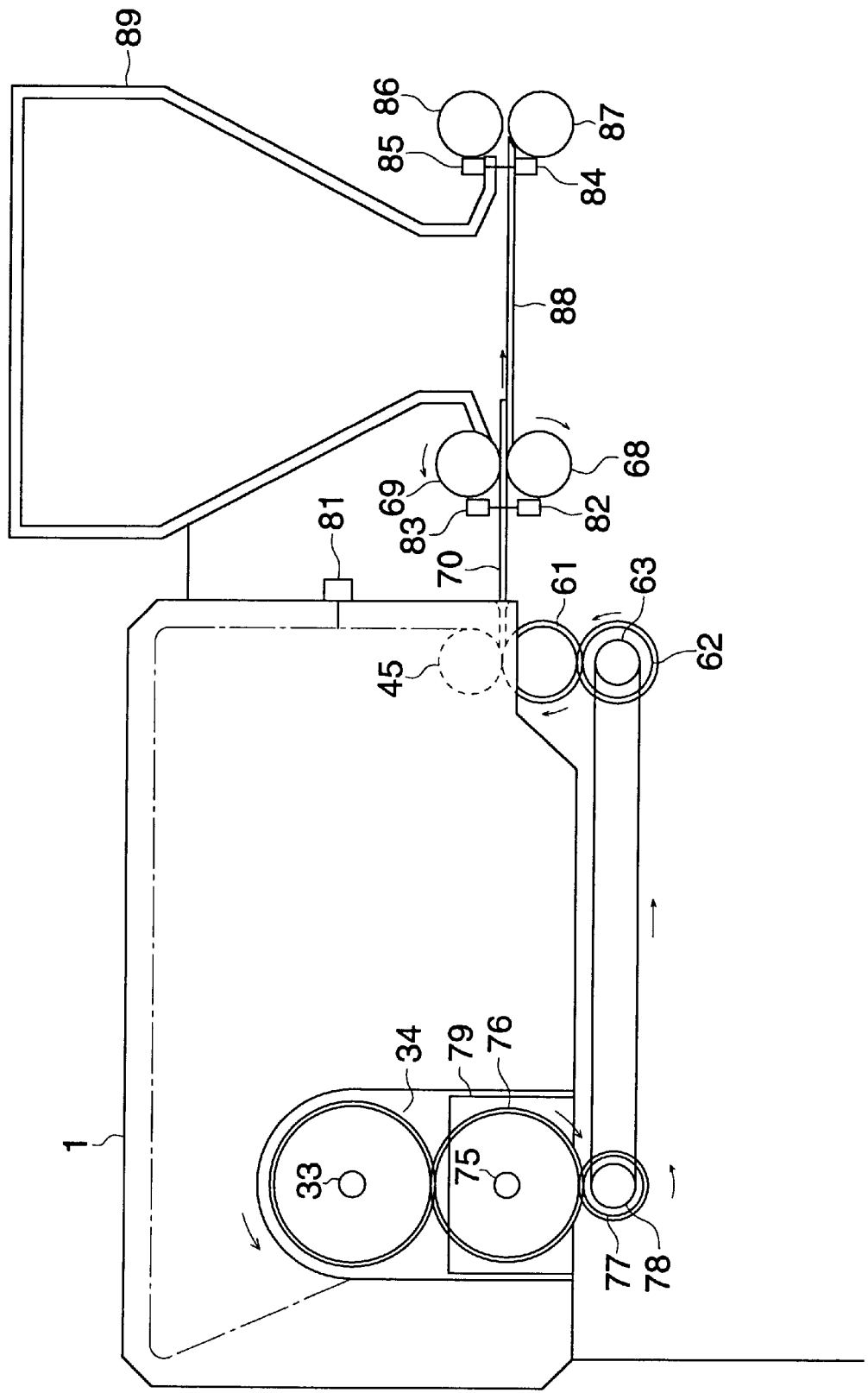
FIG. 13 is a schematic structural diagram showing the state where the mechanism for taking out negatives held in the negative holder in the first embodiment is attached to a photographic printing apparatus.

FIG. 13 is a schematic structure diagram wherein a mechanism for taking out negatives 70 held in negative holder 1 is normally combined with a photographic printing machine. The photographic printing machine has therein a solid structure which includes an image pickup section which picks up images in succession from negatives received in succession, a printing condition determining section which determines printing conditions from the results of image pickup made in the image pickup section, and a printing section where printing is made from the negative made through image pickup in the image pickup section on a light-sensitive material for printing (photographic paper, film for printing, etc.) under the printing conditions determined by the printing condition determining section. The negative sent from the conveyance drive rollers 68 and 69 passes through guide 88 and is sent to the second conveyance drive rollers 86 and 87 which send the negative to the image pickup section. The distance between the conveyance drive rollers 68 and 69 and the second conveyance drive rollers 86 and 87 is set to be shorter than the negative having the shortest length capable of being processed by the photographic printing machine, thus, all negatives capable of being processed by this photographic printing machine can be conveyed. Further, accumulation section 89 is provided over a part of the conveyance path between the conveyance drive rollers 68 and 69 and the second conveyance drive rollers 86 and 87. The accumulation section 89 is of a size capable of accumulating the negative 70 having the maximum length capable of being processed by the photographic printing machine, and thereby it can accumulate all negatives 70 provided that they can be processed by the photographic printing machine, by accumulating therein negatives 70.

Incidentally, when the conveyance drive rollers 68 and 69 and the second conveyance drive rollers 86 and 87 are driving for rotation, the conveyance speed for the negative 70 by the conveyance drive rollers 68 and 69 is not lower than the maximum moving speed for the negative 70 moved by the second conveyance drive rollers 86 and 87 (corresponding to a part of the image pickup section in a photographic processing means). Therefore, the conveyance speed for the negative 70 by the conveyance drive rollers 68 and 69 is always not lower than the moving speed for the negative 70 moved by the second conveyance drive rollers 86 and 87, thus, it is possible to accumulate negatives 70 in the accumulation section 89.

There are provided first optical sensor 83 for detecting the negative and light source 82 for the first optical sensor 83 before the conveyance drive rollers 68 and 69, and there are provided second optical sensor 85 for detecting the negative and light source 84 for the second optical sensor 85 before the second conveyance drive rollers 86 and 87. These first optical sensor 83 and second optical sensor 85 detect the existence at each position of the negative. For both of the first optical sensor 83 and second optical sensor 85, a leading edge of the negative in the conveyance direction is detected by the moment when the state of detection of nonexistence is changed to the state of detection of existence, and a trailing edge of the negative in the conveyance direction is detected by the moment when the state of detection of existence is changed to the state of detection of nonexistence. From the results of detection conducted by the first optical sensor 83 and the second optical sensor 85 and from acceptable/unacceptable information which means information about whether the image pickup section can accept another negative or not, an unillustrated drive motor (take-out mechanism drive motor) in the mechanism for taking out negative 70 held in negative holder 1, the conveyance drive rollers 68 and 69 and the second conveyance drive rollers 86 and 87 are controlled in terms of driving.

Namely, when the trailing edge of the negative 70 is detected by the second optical sensor 85, the take-out mechanism drive motor and the conveyance drive rollers 68 and 69 are driven, and negative 70 to be fed out next among negatives held in the negative holder 1 is fed out. Then, when the leading edge of the negative 70 is detected by the second optical sensor 85, the second conveyance drive rollers 86 and 87 are driven. In this case, when the acceptable/unacceptable information shows unacceptable, the second conveyance drive rollers 86 and 87 are suspended after a certain period of time $\alpha$. Then, the second conveyance drive rollers 86 and 87 are kept to be suspended until the moment when the acceptable/unacceptable information shows acceptable, and when the acceptable/unacceptable information shows acceptable, the second conveyance drive rollers 86 and 87 are driven again. When the acceptable/unacceptable information shows acceptable in the case that the second optical sensor 85 detects the leading edge of the negative 70, the second conveyance drive rollers 86 and 87 are kept to be driven. Incidentally, a certain period of time $\alpha$ is a prescribed time period that is not shorter than the time required for the leading edge of the negative to move from the position of the second optical sensor 85 to the position where the leading edge is pinched by the second conveyance drive rollers 86 and 87. When the first optical sensor 83 detects the trailing edge of the negative, the take-out mechanism drive motor is stopped, and then, the conveyance drive rollers 68 and 69 are stopped after a certain period of time $\alpha$. Incidentally, a certain period of time $\alpha$ is a prescribed time period that is not shorter than the time required for the trailing edge of the negative to move from the position of the first optical sensor 83 to the position where the trailing edge passes the conveyance drive rollers 68 and 69. The control mentioned above is repeated in the above-mentioned manner.

Each of conveyance drive rollers provided on the photographic printing machine, including the conveyance drive rollers 68 and 69 and the second conveyance drive rollers 86 and 87 is provided with a torque limiter so that slipping takes place on the roller to prevent that the negative would not be subjected to tension that is not lower than the predetermined tension when a torque equal to or greater than a predetermined torque is applied on the roller. It is naturally possible to use a one-way clutch in place of a torque limiter.

Though a torque limiter is used in the negative holder 1 in the present embodiment to prevent that belt-shaped member 20 is rewound to be slackened, a one-way clutch may also be used in place of a torque limiter.

Embodiment 2

Figure 14:
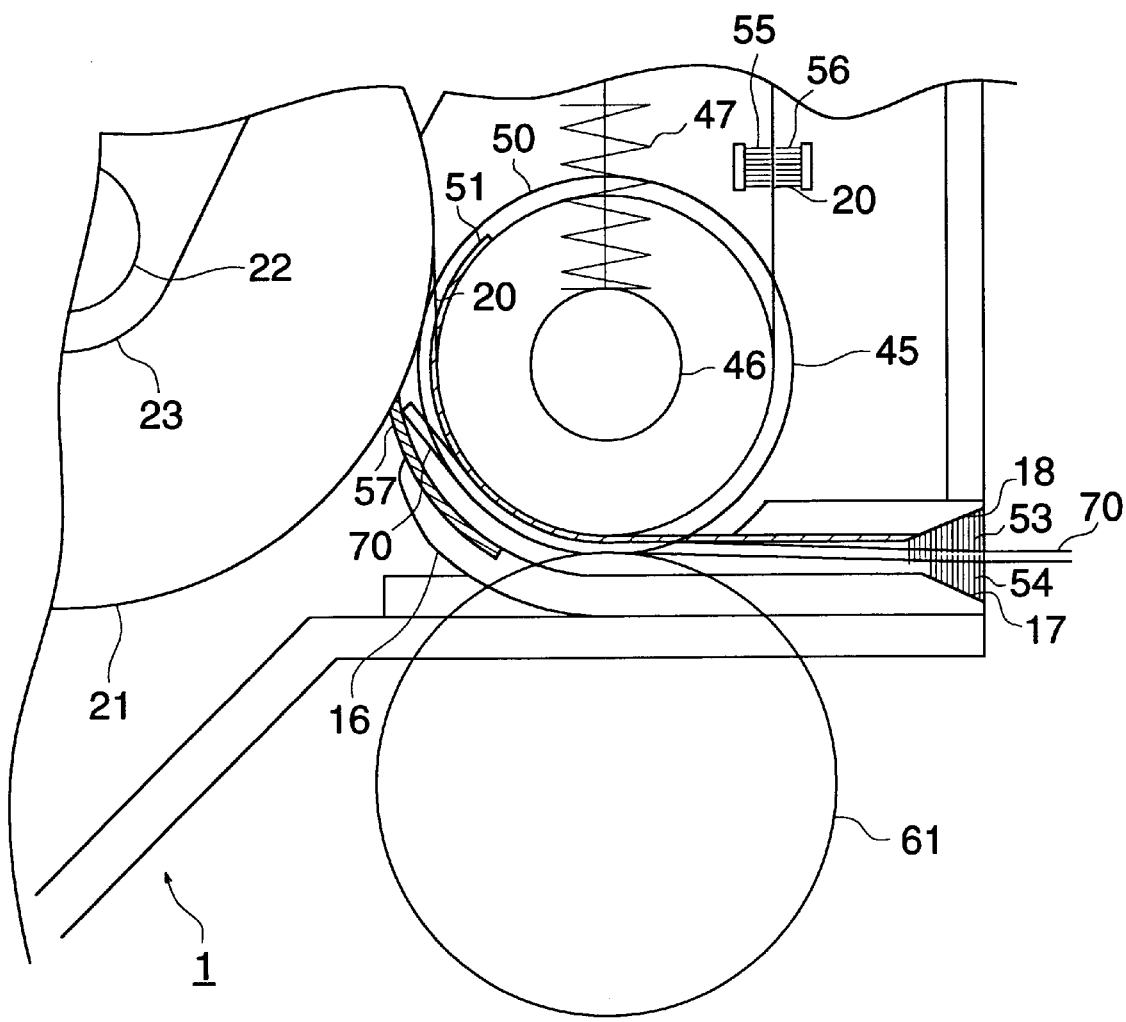
FIG. 14 is a partially enlarged view of a negative holder in which negatives are not yet held in the second embodiment.
Figure 15:
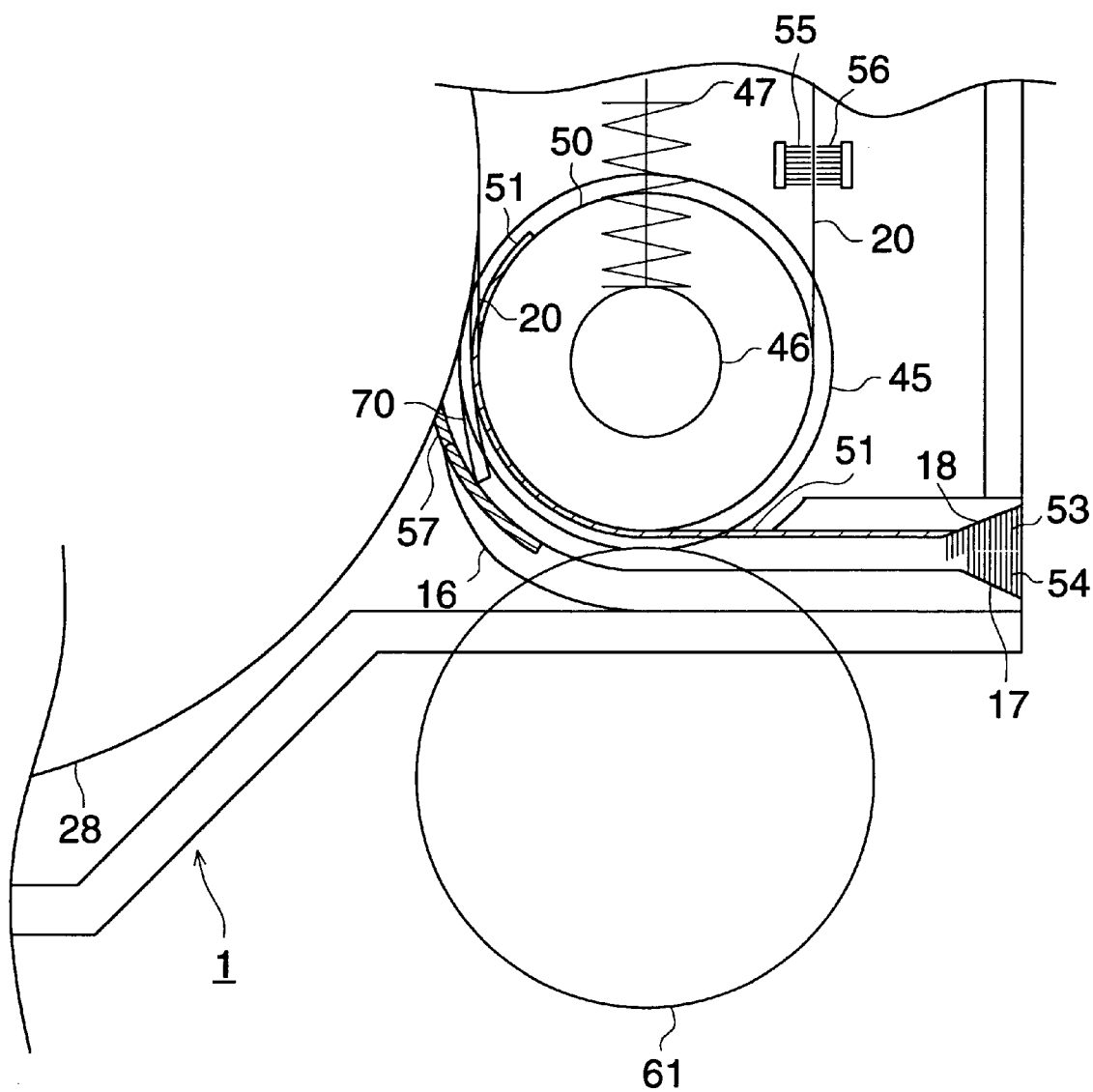
FIG. 15 is a partially enlarged view of a negative holder in which the maximum quantity of negatives are held in the second embodiment.
Figure 16:
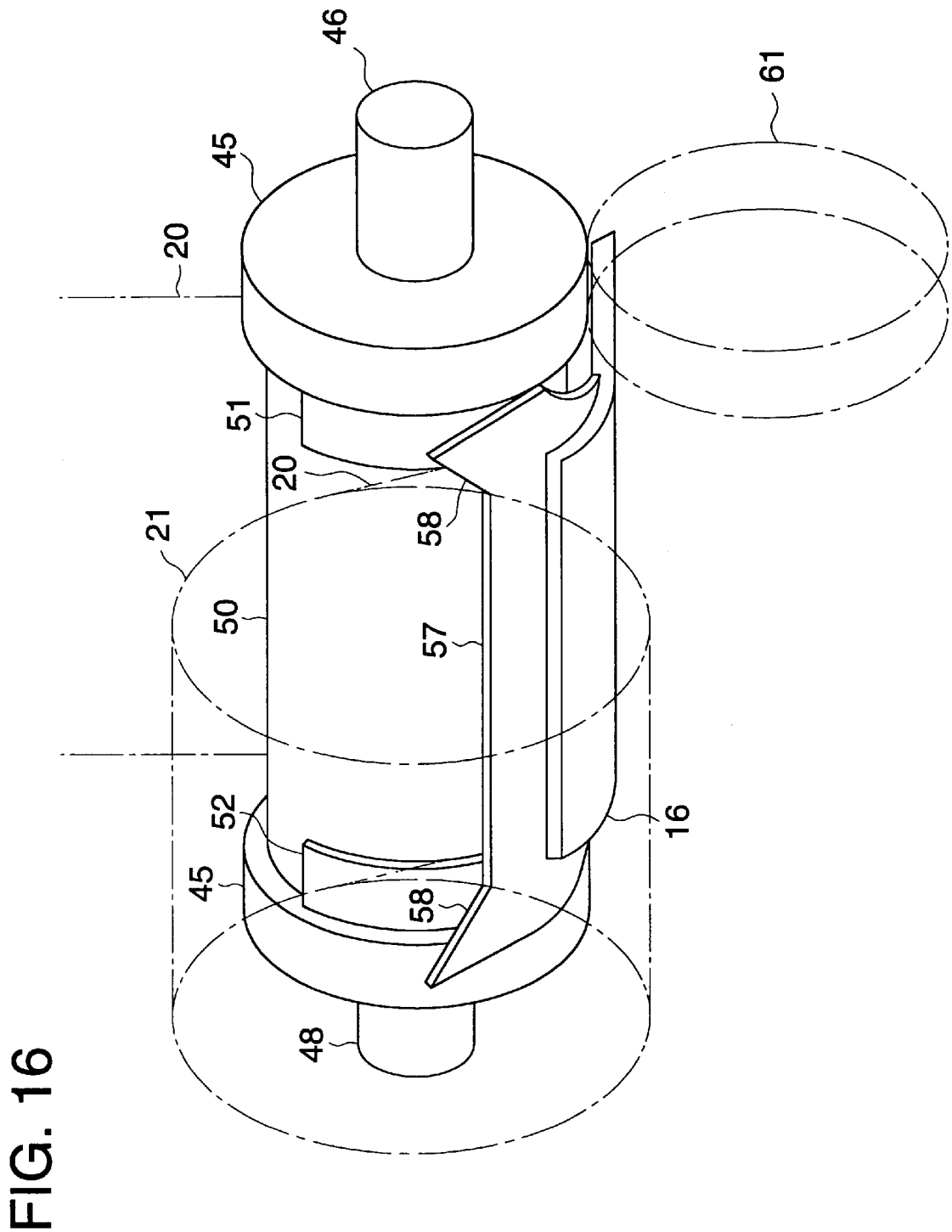
FIG. 16 is a partially enlarged perspective view of a negative holder in which negatives are not yet held in the second embodiment.
Figure 17:
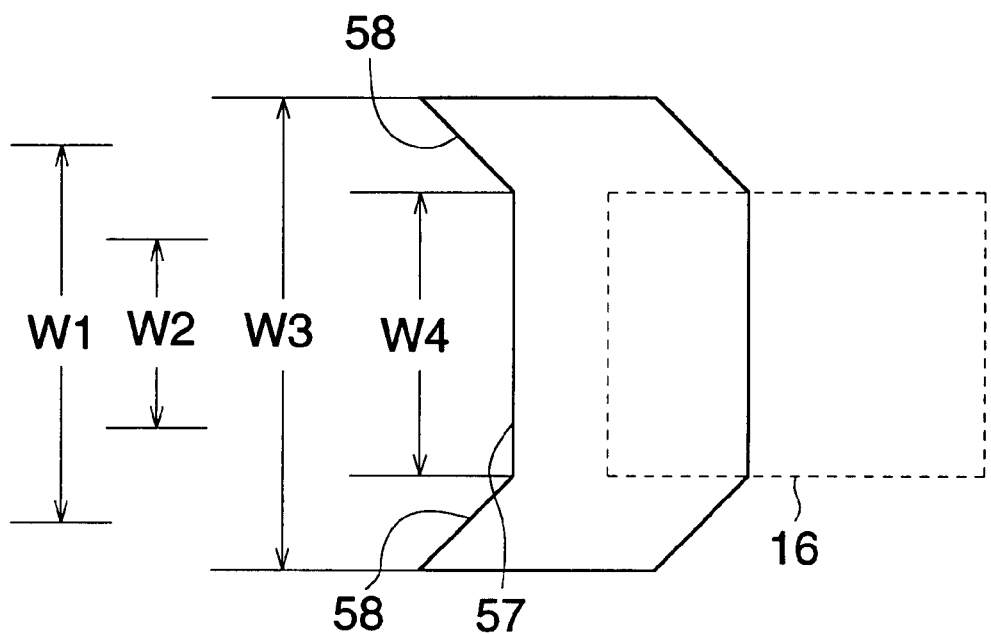
FIG. 17 is a diagram showing the shape of a plastic film provided on the tip of guide 16 in the second embodiment.

Only difference between Embodiment 2 and Embodiment 1 is a structure in the vicinity of the third roller of negative holder 1 in Embodiment 1. There will be described only the points which are different from Embodiment 1 as follows. Incidentally, the points which are not described below are exactly the same as those in Embodiment 1. FIG. 14 is a partially enlarged diagram of negative holder 1 holding no negatives in Embodiment 2, which shows a structure in the vicinity of the third roller of negative holder 1 in Embodiment 2. FIG. 15 is a partially enlarged diagram of negative holder 1 holding the maximum quantity of negatives in Embodiment 2. FIG. 16 is a partially enlarged perspective view of negative holder 1 holding no negatives in Embodiment 2, and FIG. 17 shows a shape of plastic film 57 provided on the tip of guide 16.

Third roller 45 is provided with a groove whose width is the same as that of negative 70 so that the negative may be conveyed, keeping itself within a predetermined lateral position. Further, the third roller is arranged so that its axis is in parallel with that of the first roller 21. Due to this, belt-shaped member 20 which has passed the third roller can be taken up by the first roller 21 without being twisted.

Further, roller guides 51 are provided on both sides of belt-shaped member 20 to prevent that the negative 70 is inserted between guide 18 and the third roller 45 along the third roller. In addition, an inner surface of each of two roller guides 51 serves also as a guide for the belt-shaped member 20.

Dustprotectors (horsehair) 55 and 56 are provided on a conveyance path for belt-shaped member 20 in the vicinity of the third roller to remove dust adhering to both sides of the belt-shaped member 20, so that dust adhering to the belt-shaped member 20 may not adhere to the negative 70 to be taken up.

In the same way as in the foregoing, dustprotectors (horsehair) 53 and 54 are provided on a gateway of negative holder 1 for the purpose of removing dust adhering to the negative 70 to be held, thus, dust adhering to both sides of the negative to be held can be removed. Incidentally, each of guides 17 and 18 is provided with each of horsehairs 53 and 54 in the present embodiment for the purpose of providing the dustprotectors (horsehair) 53 and 54 on a gateway of the negative holder 1.

The guide 16 has its guide surface to guide negative 70 which is formed to follow the third roller 45, and it guides the negative 70 toward pinching position 10. On the tip of the guide 16, there is provided plastic film (for example, Mylar film: trade name) 57. As is shown in FIG. 15, the negative holder 1 is one for feeding out, by rewinding the belt-shaped member 20 taken up by the first roller 21, the negative 70 taken up and held, and the plastic film 57 provided on the tip of the guide 16 bends and is constantly in contact with the outermost circumference 28 of belt-shaped member 20 wound on the first roller 21, and peels off the negative 70 to be fed out of the outermost circumference 28 of belt-shaped member 20 wound on the first roller 21, thus, the negative 70 to be fed out is guided by the plastic film 57 and the guide 16 toward an exit. This can be done because pinching position 10 where the negative 70 is pinched between the outermost circumference 28 of belt-shaped member 20 wound on the first roller 21 and the first roller 21 is mostly constant, as described later.

A shape of the plastic film 57 is one wherein both ends 58 of the tip of the guide are tilted inwardly on the bottom of a recess having a width of W4 that is the same as that of the guide 16, as shown in FIG. 17, and a portion where the both ends are tilted inwardly comes in contact with the outermost circumference of the belt-shaped member wound on the first roller, thus, the negative is guided by the portion where the both ends are tilted inwardly, to be peeled from the outermost circumference of the belt-shaped member. For that reason, width W3 between both ends 58 on the tip of the guide is greater than width W1 of the negative, and width W4 of the bottom of a recess is smaller than width W1 of the negative and is greater than width W2 of the belt-shaped member 20.

Embodiment 3

Figure 18:
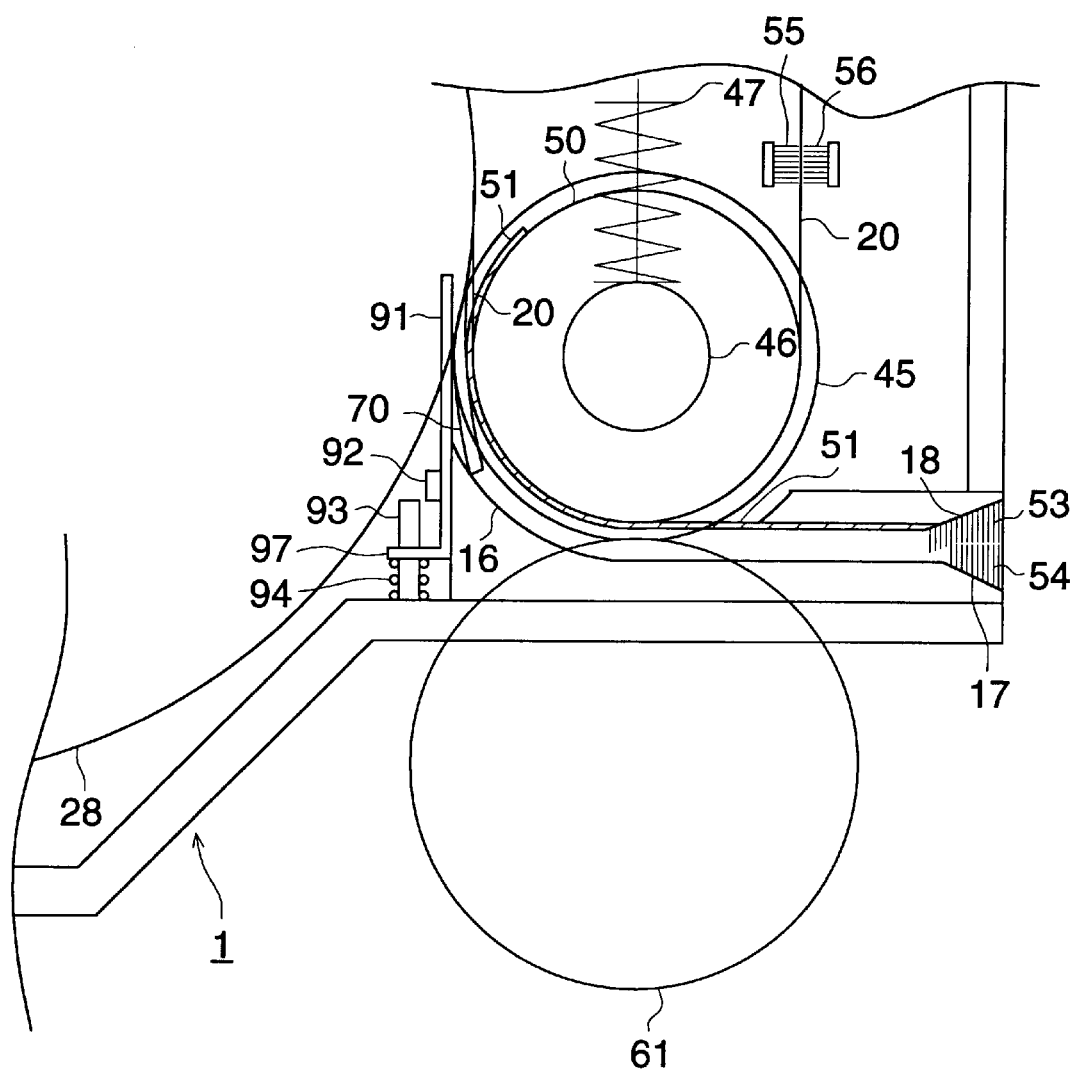
FIG. 18 is a partially enlarged view of a negative holder in which the maximum quantity of negatives are held in the third embodiment.
Figure 19:
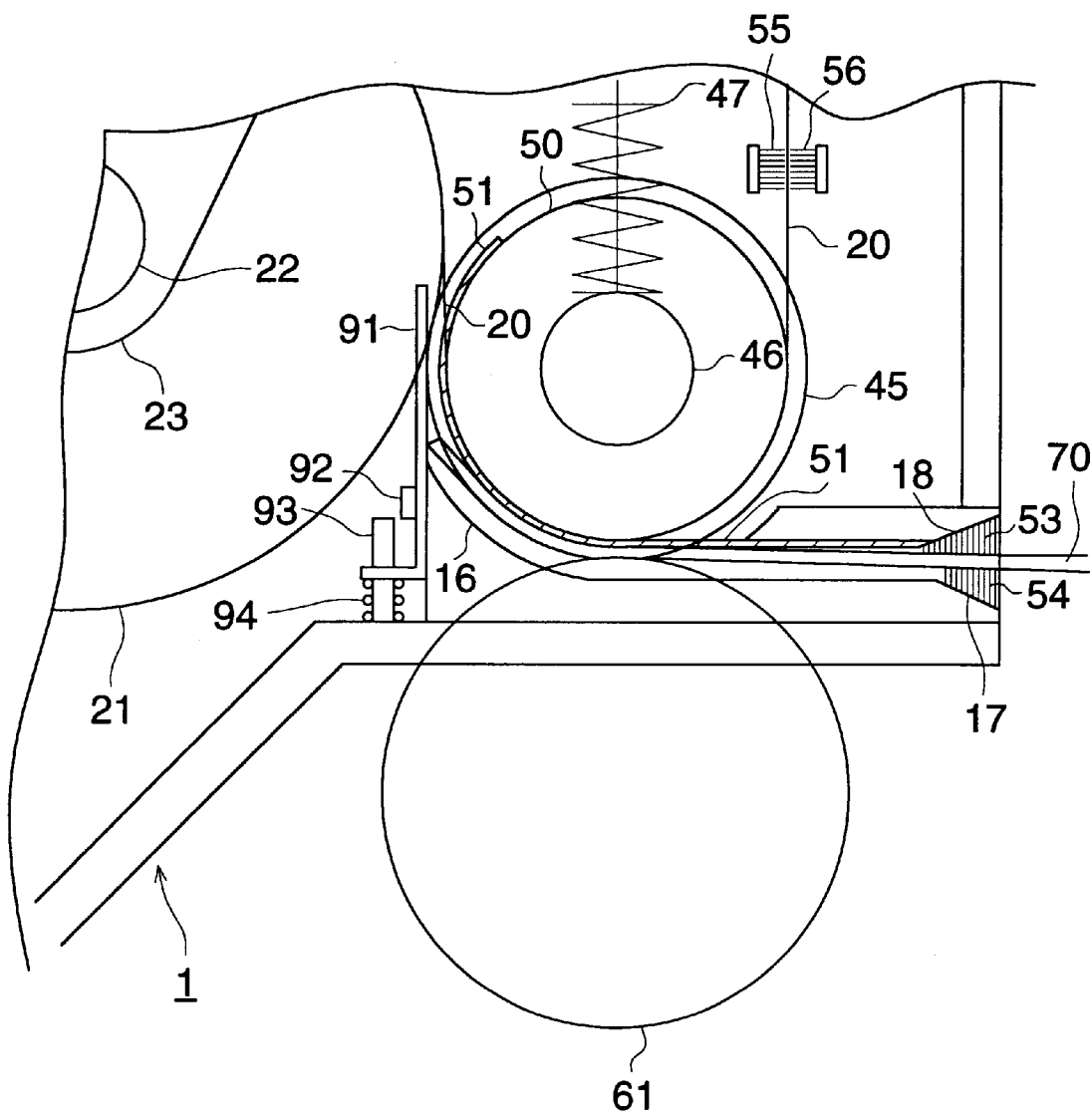
FIG. 19 is a partially enlarged view of a negative holder in which negatives are not yet held in the third embodiment.
Figure 20:
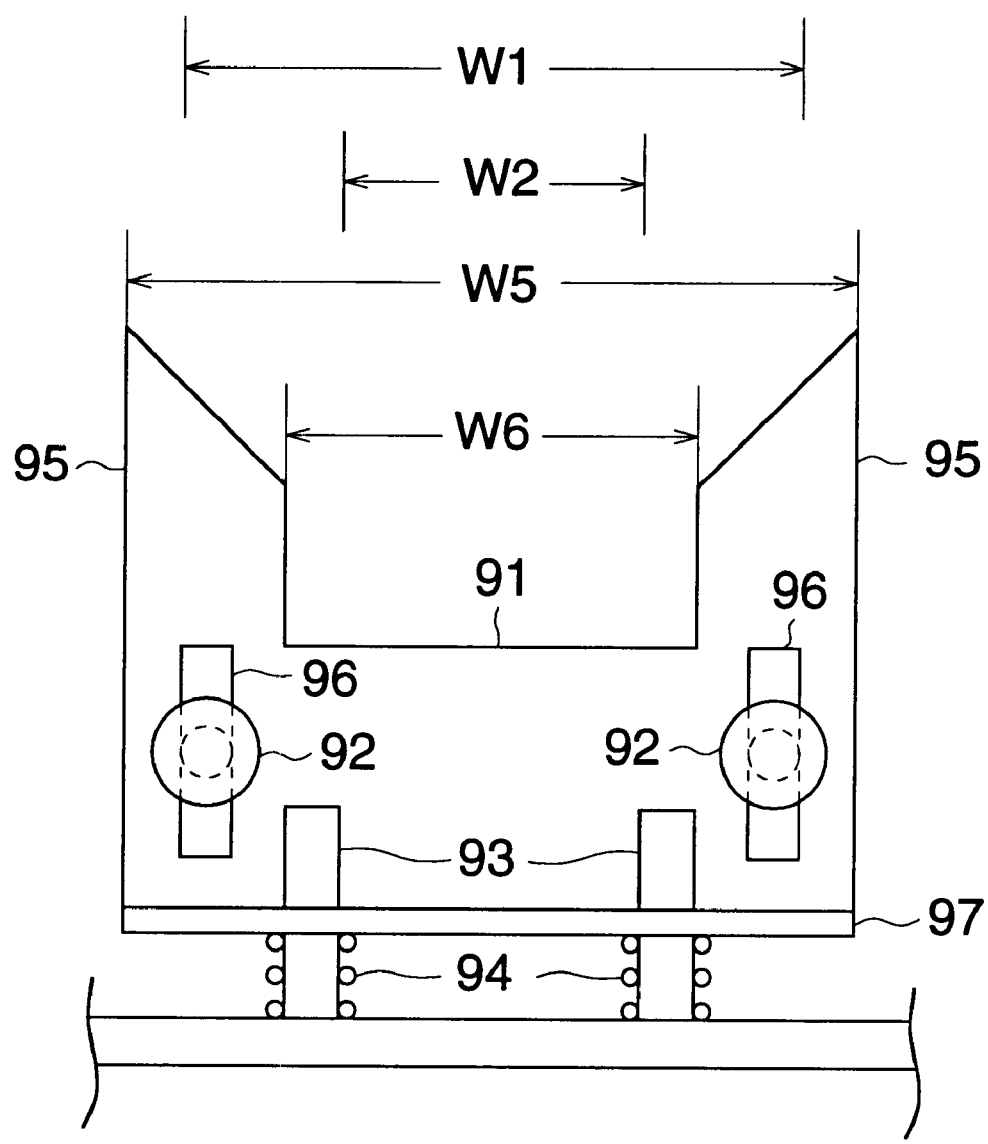
FIG. 20 is a diagram showing the shape of a plastic film provided on the tip of guide 16 in the third embodiment.

Only difference between Embodiment 3 and Embodiment 1 is a structure in the vicinity of the third roller of negative holder 1 in Embodiment 1. There will be described only the points which are different from Embodiment 1 as follows. Incidentally, the points which are not described below are exactly the same as those in Embodiment 1. FIG. 19 is a partially enlarged diagram of negative holder 1 holding no negatives in Embodiment 3, which shows a structure in the vicinity of the third roller of negative holder 1 in Embodiment 3. FIG. 18 is a partially enlarged diagram of negative holder 1 holding the maximum quantity of negatives in Embodiment 3. and FIG. 20 shows a shape of plastic film 91 provided on the tip of guide 16.

Third roller 45 is provided with a groove whose width is the same as that of negative 70 so that the negative may be conveyed, keeping itself within a predetermined lateral position. Further, the third roller is arranged so that its axis is in parallel with that of the first roller 21. Due to this, belt-shaped member 20 which has passed the third roller can be taken up by the first roller 21 without being twisted.

Further, roller guides 51 are provided on both sides of belt-shaped member 20 to prevent that the negative 70 is inserted between guide 18 and the third roller 45 along the third roller. In addition, an inner surface of each of two roller guides 51 serves also as a guide for the belt-shaped member 20.

Dustprotectors (horsehair) 55 and 56 are provided on a conveyance path for belt-shaped member 20 in the vicinity of the third roller to remove dust adhering to both sides of the belt-shaped member 20, so that dust adhering to the belt-shaped member 20 may not adhere to the negative 70 to be taken up.

In the same way as in the foregoing, dustprotectors (horsehair) 53 and 54 are provided on a gateway of negative holder 1 for the purpose of removing dust adhering to the negative 70 to be held, thus, dust adhering to both sides of the negative to be held can be removed. Incidentally, each of guides 17 and 18 is provided with each of horsehairs 53 and 54 in the present embodiment for the purpose of providing the dustprotectors (horsehair) 53 and 54 on a gateway of the negative holder 1.

The guide 16 has its guide surface to guide negative 70 which is formed to follow the third roller 45, and it guides the negative 70 toward pinching position 10. On the surface at the tip of the guide 16 (the surface shown to be perpendicular in FIGS. 18 and 19), there is provided plastic film (for example, Mylar film: trade name) 91. As is shown in FIG. 18, the negative holder 1 is one for feeding out, by rewinding the belt-shaped member 20 taken up by the first roller 21, the negative 70 taken up and held, and the plastic film 91 provided on the tip of the guide 16 is urged and is constantly in contact with the outermost circumference 28 of belt-shaped member 20 wound on the first roller 21, and peels off the negative 70 to be fed out of the outermost circumference 28 of belt-shaped member 20 wound on the first roller 21, thus, the negative 70 to be fed out is guided by the plastic film 91 and the guide 16 toward an exit. This can be done because pinching position 10 where the negative 70 is pinched between the outermost circumference 28 of belt-shaped member 20 wound on the first roller 21 and the first roller 21 is mostly constant, as described later.

Incidentally, for the purpose of urging the plastic film 91 against the outermost circumference 28 of belt-shaped member 20 wound on the first roller 21, the rear end of the plastic film 91 is bent to be right-angled, a hole made on rear end surface 97 bent to be right-angled is engaged with penetrating shaft 93, and coil spring 94 is provided on the penetrating shaft 93 between the bottom surface of a negative holder main body and the rear end surface 97. Thus, the plastic film 91 is constantly urged against the outermost circumference 28 of belt-shaped member 20 wound on the first roller 21. Incidentally, as shown in FIG. 20, regulator 92 that penetrates through slit 96 provided on the plastic film 91 in the urging direction, and guides the plastic film 91 so that it may not leave the surface on the tip of the guide, guides the plastic film 91 so that it can move in the urging direction without leaving the surface on the tip of the guide.

A shape of the plastic film 91 is one wherein both ends 95 of the tip of the guide are tilted inwardly on the bottom of a recess on the tip having a width of W4 that is the same as that of the guide 16, as shown in FIG. 20, and a portion where the both ends are tilted inwardly comes in contact with the outermost circumference 28 of the belt-shaped member 20 wound on the first roller, thus, the negative is guided by the portion where the both ends are tilted inwardly, to be peeled from the outermost circumference 28 of the belt-shaped member 20. For that reason, width W3 between both ends 95 on the tip of the guide is greater than width W1 of the negative 70, and width W4 of the bottom of a recess is smaller than width W1 of the negative 70 and is greater than width W2 of the belt-shaped member 20.

Next, an preferable example of the belt-shaped member 20 will be described. The belt-shaped member 20 in the photographic film magazine in Examples 1 and 2, is structured such that it is not in contact with the entire surface of the photographic document 70 which is wound and accommodated in the magazine. As the film having such the structure, the following is listed, and as the belt-shaped member 20 in the photographic film magazine in the present example, any one is allowable.

Figure 21:
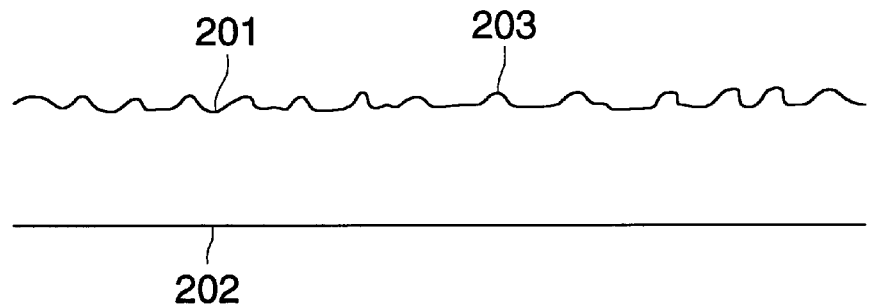
FIGS. 21(A) and 21(B) are illustrations of preferable examples of belt-shaped member.
Figure 21:
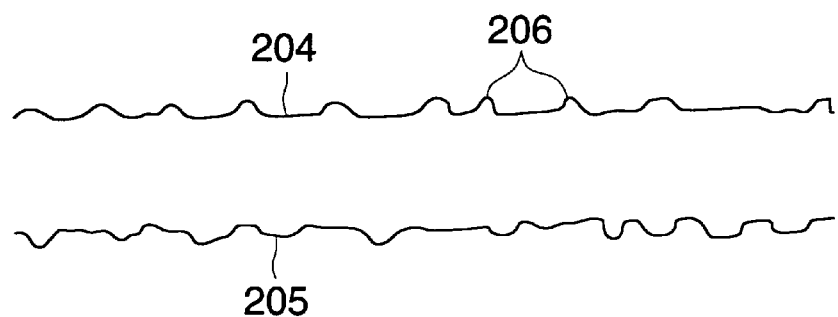

Firstly, as shown in FIG. 21(A), the belt-shaped member in which the outer peripheral surface 201 formed when it is wound by the first roller 21, that is, the surface which comes into contact with the photographic document 70, is formed of the matte surface (the inner peripheral surface 202 may be the smooth surface), and secondly, as shown in FIG. 21(B), the belt-shaped member in which both of the front and rear surfaces, that is, the outer peripheral surface 204 and the inner peripheral surface 205, formed when the belt-shaped member is wound by the first roller 21, are formed of the matte surface, are listed. In the belt-shaped member in which the outer peripheral surfaces 201 and 204 formed when the belt-shaped member is wound by the first roller 21, are formed of the matte surface, the surfaces 201 and 204 contact with the photographic document 70 at only protrusions 203 and 206 of the matte surface, therefore, the belt-shaped member hardly adheres closely to the photographic document 70, and when the photographic document 70 is sent out, it is easily peeled off from the outermost peripheral belt-shaped member 20 of the first roller 21, thereby, it is easily delivered stably. Paste and dusts adhered to the photographic document 70 are difficult to adhere to the belt-shaped member 20, and easily taken off. Therefore, it can be suppressed that the accommodated photographic document 70 are damaged by the paste and dusts, and the photographic document 70 is hardly peeled off from the belt-shaped member 20. From the above description, the photographic document 70 can be stably delivered.

Incidentally, the matte surface is defined as follows:

In the present invention, the matte surface means a surface having a roughness satisfying the following formula: 3 $\mu m \leq Ra \leq 20000$ $\mu m$ and 30 $\mu m \leq Rt \leq 2000$ $\mu m$, more preferably 50 $\mu m \leq Ra \leq 5000$ $\mu m$ and 50 $\mu m \leq Rt \leq 1000$ $\mu m$. Herein, Ra is a center line mean roughness and represents a general rough degree of the surface. Rt is the maximum height and indicates the height of a protrusion on the surface. As a result of our study, when a balance between the general rough degree and the height of a protrusion on the surface resides in the above range, good effect was observed.

The center line mean roughness Ra is obtained the following formula and is expressed in micrometer ($\mu m$) when a part of measuring length 1 is extracted in the direction of its center-line from the extraction curve (roughness curve), the center-line of this extracted part is taken as X-axis, the direction of vertical magnification is taken as Y-axis, and the extraction curve is expressed by Z=f(x).

$$Ra = 1/L \int_o^L |f(x)| dx \; (\mu m)$$

Figure 28:
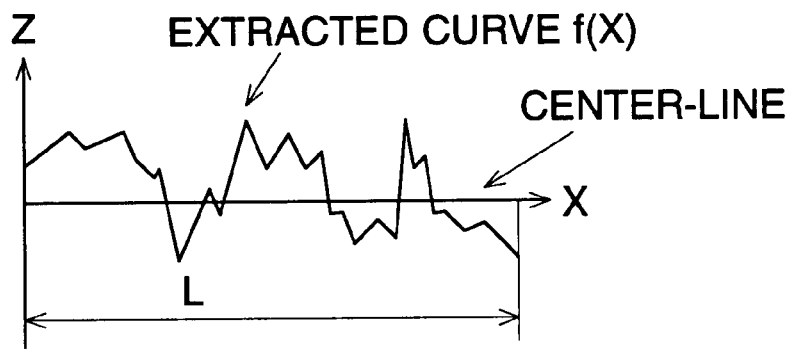
FIGS. 28(A) and 28(B) are diagrams explaining roughness respectively.
Figure 28:
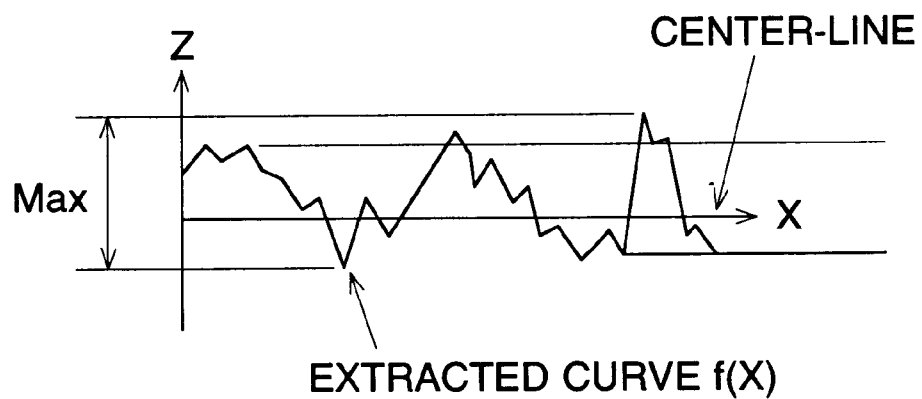

Namely, in FIG. 28(A), the center line mean roughness Ra represents an average deviation obtained by dividing an area of the region enclosed by the extracted curve and the center-line with the measuring length. The center-line is a straight line with which the area of concave portions is made equal to the area of convex portions.

Figure 22:
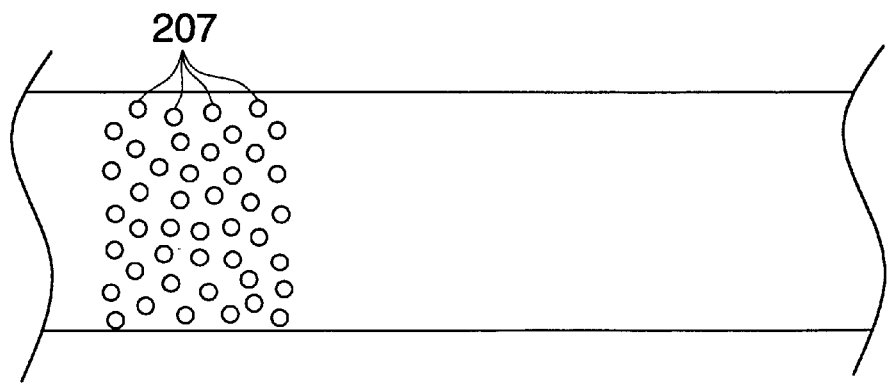
FIGS. 22 is an illustration of preferable another example of belt-shaped member.

The maximum height Rt, when a part of measuring length 1 is extracted from the extraction curve and the extracted portion is interposed between the two parallel straight lines with a mean line of the extracted portion, is measured the spacing of these two straight lines in the direction of vertical magnification and is expressed in micrometer ($\mu m$), see FIG. 28(B). When the extracted curve is expressed by Z f(X), and the mean line is expressed by z=ax+b, Max=max (f(x)−ax−b)−min (f(x)−ax−b). ($\mu m$) Thirdly, as shown in FIG. 22, the belt-shaped member is listed in which a plurality of small holes 207 are arranged in the widthwise direction and the lengthwise direction of the belt-shaped member 20. The method of arrangement of the small holes 207 is not limited to the method shown in FIG. 22, but any method may be allowable. Due to this, when the photographic document 70 wound by the first roller 21 is wound and accommodated in the magazine, the belt-shaped member is in contact with the photographic document 70 only at portions other than small holes, and air comes in and goes out from the small holes, therefore, the belt-shaped member 20 is hardly adheres closely to the photographic document 70. Thereby, when the photographic document 70 is sent out, it is easily peeled off from the outermost peripheral belt-shaped member 20 of the first roller 21, and thereby, it can be easily and stably sent out. Paste and dusts adhered to the photographic document 70 are difficult to adhere to the belt-shaped member 20, and easily taken off. Therefore, it can be suppressed that the accommodated photographic document 70 is damaged by the paste and dusts, and the photographic document 70 is hardly peeled off from the belt-shaped member 20. From the above description, the photographic document 70 can be stably sent out.

Figure 23:
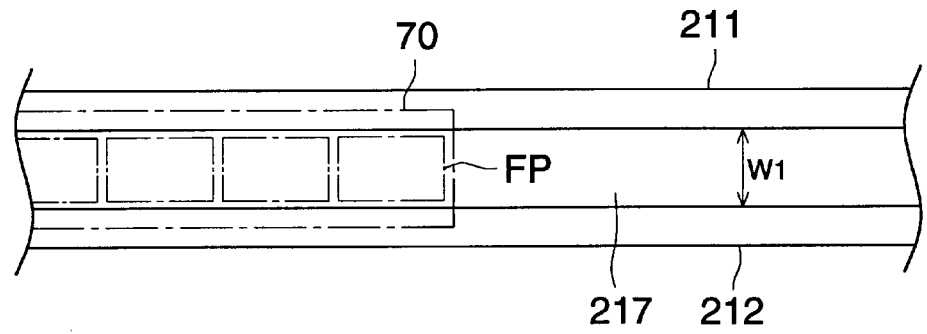
FIGS. 23(A) to 23(C) are illustrations of preferable another examples of belt-shaped member.
Figure 23:
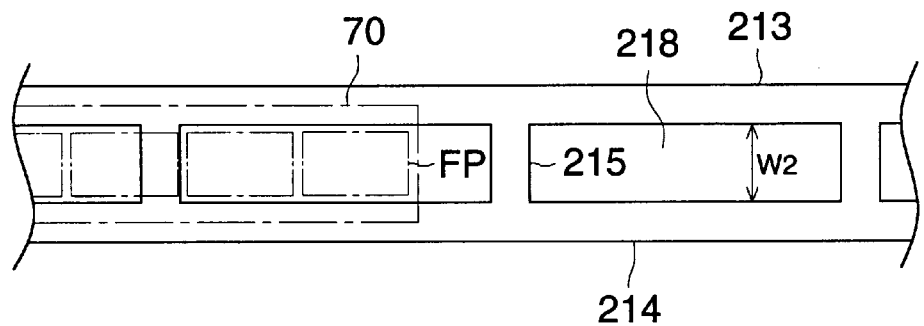
Figure 23:
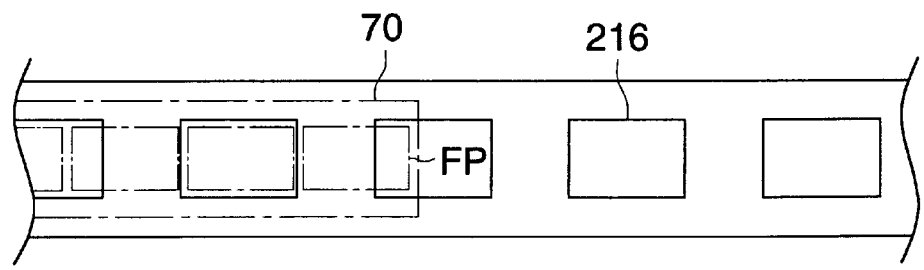

Fourthly, as shown in FIG. 23(A), the belt-shaped member is listed which is composed of 2 lines of belt-shaped members 211 and 212, which are perfectly separated from each other, so that these belt-shaped members 211 and 212 perfectly avoid the position in the widthwise direction of the frame image FP recorded on the photographic document 70. The width of a gap W1 formed between 2 lines of belt-shaped members 211 and 212, is larger than that of the frame image FP recorded on the photographic document 70. Steps are provided on the outer periphery of the third roller 130 to guide the 2 lines of belt-shaped members 211 and 212 to respectively predetermined positions in the widthwise direction, so that the 2 lines of belt-shaped members 211 and 212 are accurately wound at the predetermined positions in the widthwise direction. Thereby, the 2 lines of belt-shaped members 211 and 212 are respectively guided to the predetermined positions in the widthwise direction, and the photographic document 70 is guided to a predetermined position in the widthwise direction by a guide 180. Thereby, the photographic document 70 can be wound in such a manner that these belt-shaped members 211 and 212 perfectly avoid the position in the widthwise direction of the frame image FP recorded on the photographic document 70.

Fifthly, as shown in FIG. 23(B), a ladder type belt-shaped member is listed which is composed of 2 lines of belt-shaped members 213 and 214, which perfectly avoid the position in the widthwise direction of the frame image FP recorded on the photographic document 70, and a portion 215 which is stretched between the belt-shaped members. The width of a gap W2 between the 2 lines of belt-shaped members 213 and 214 is larger than that of the frame image FP recorded on the photographic document 70. In this case, the width of the gap W2 between the 2 lines of belt-shaped members 213 and 214 is maintained to a predetermined value by the stretching portion 215, and therefore, the 2 lines of belt-shaped members 213 and 214 are wound at the predetermined position in the widthwise direction by only the guide of the side plates 170B and 170C. Thereby, the 2 lines of belt-shaped members 211 and 212 ae respectively guided at the predetermined positions in the widthwise direction, and the photographic document 70 is guided to a predetermined position in the widthwise direction by the guide 180. Therefore, the photographic document 70 can be wound in such a manner that these belt-shaped members 211 and 212 perfectly avoid the position in the widthwise direction of the frame image FP recorded on the photographic document 70.

Sixthly, as shown in FIG. 23(C), a plurality of openings 216 are arranged in the lengthwise direction, and the width of the opening 216 corresponds to the position in the widthwise direction of the frame image FP recorded on the photographic document 70. This opening may be a rectangular, or other shapes. Further, the openings 216 may be provided at a predetermined interval in the lengthwise direction, or at irregular intervals. In this case also, in the same manner as in FIG. 23(B), the photographic document 70 can be wound in such a manner that the position in the widthwise direction of the frame image FP recorded on the photographic document 70 is almost avoided.

As in the fourth to sixth examples, when a plurality of openings formed in the belt-shaped member 20 are openings 216 to 218 provided over the position in the widthwise direction corresponding to the position at which the frame image FP of the photographic document 70 is recorded, paste or dusts adhered to the photographic document is easily taken off from the openings 216 to 218 formed in the belt-shaped member 20, and even when paste or dusts is adhered to the belt-shaped member, because the openings 216 to 218 opened over the position in the widthwise direction corresponding to the position at which the frame image FP of the photographic document 70 is recorded, are provided, it can be effectively suppressed that the frame image FP of the accommodated photographic document 70 is damaged, and the photographic document 70 is hardly peeled off from the belt-shaped member 20, thereby, it can be effectively suppressed that the frame image FP of the photographic document 70 is damaged.

In this connection, the belt-shaped member 20 is preferably the film having good releasability, and the releasing sheet having good releasability may be used instead of the belt-shaped member 20.

Next, cleaning of the belt-shaped member 20 in the photographic film magazine will be described. There are several methods for the cleaning of the belt-shaped member 20 in the photographic film magazine.

The first method is as follows: a cleaning film having the cleaning function to remove the paste and dusts adhered to the belt-shaped member 20 when these matters adheres to the cleaning film, under the condition that the photographic document 70 are perfectly sent out from the photographic film magazine, is accommodated from the film accommodating device 5 in the same manner as in the case of accommodation of the photographic document 70; and after the cleaning film is perfectly accommodated, it is sent from the film sending device 6. Thereby, the paste and dusts adhered to the belt-shaped member 70 now adheres to the cleaning film, so that the paste and dusts adhered to the belt-shaped member 70 can be removed.

Figure 24:
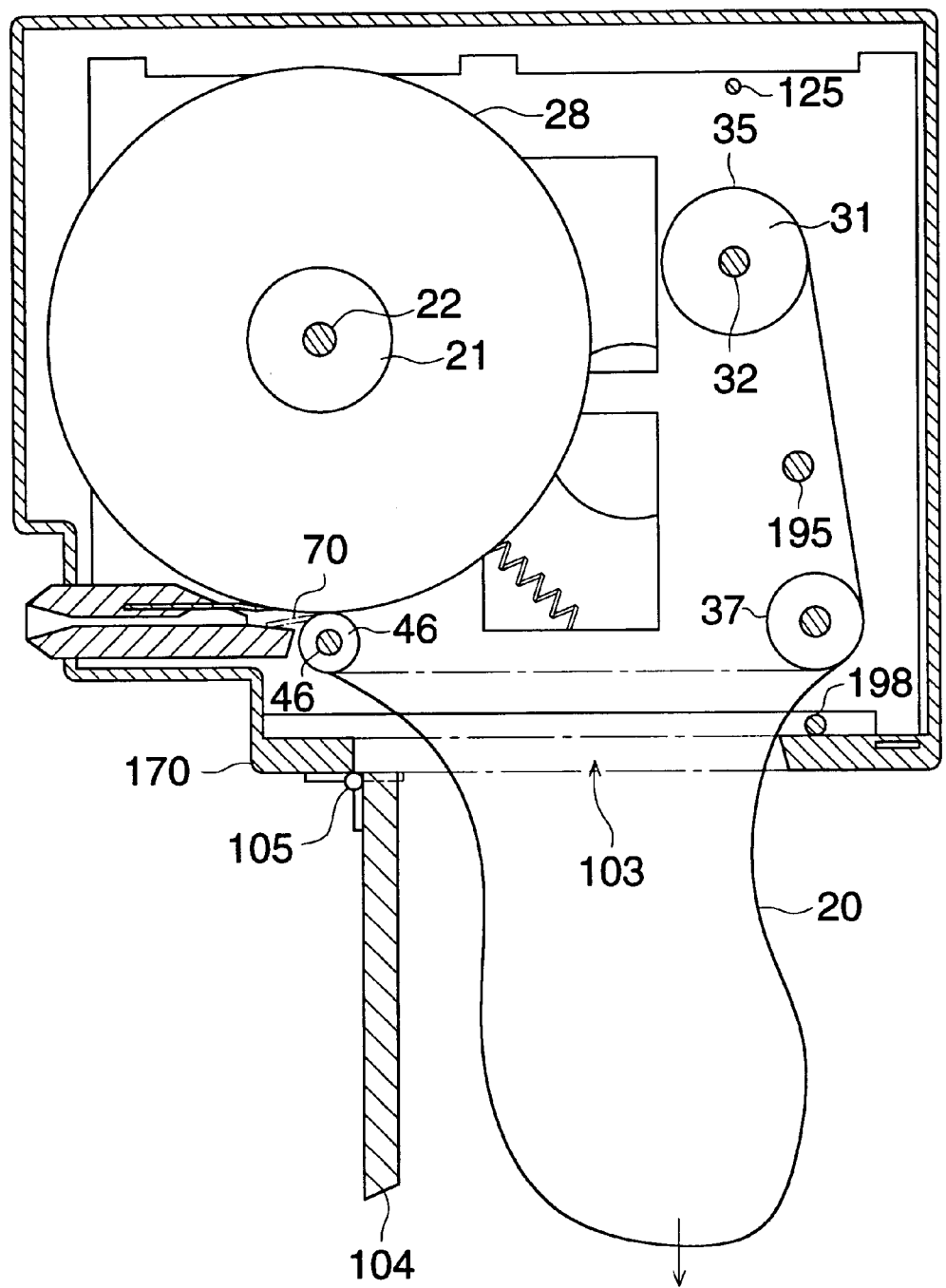
FIG. 24 is a sectional view showing a cleaning device for the belt-shaped member.

The second method is as follows: as shown in FIG. 24, a pull-out opening 103 to pull out the belt-shaped member 20 is provided in the photographic film magazine; and an opening/closing member 104 to open and close the opening 103 is provided in the outer cover 170 through a hinge 105. During a normal use, the opening/closing member 104 closes the opening 103. When cleaning is conducted, the opening/closing member 104 opens the opening 103, and the belt-shaped member 20 is pulled out from the opening 103 for cleaning. After cleaning, the belt-shaped member 20 is manually wound up from the opening 103. After the belt-shaped member 20 has been wound up, the opening/closing member 104 closes the opening 103.

Figure 25:
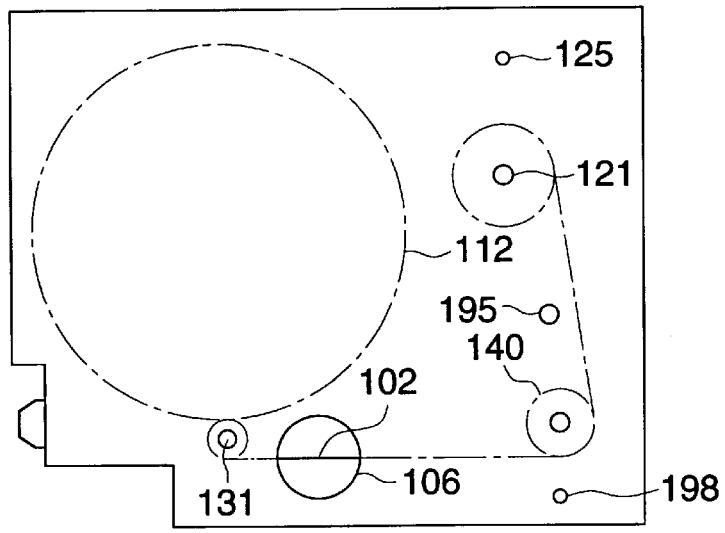
FIG. 25 is a sectional view showing another example of a cleaning device for the belt-shaped member.
Figure 26:
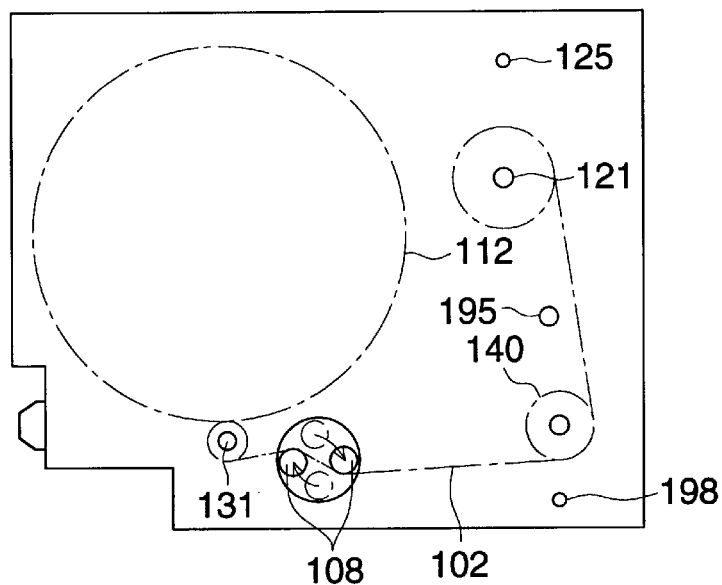
FIG. 26 is a sectional view showing another example of a cleaning device for the belt-shaped member.
Figure 27:
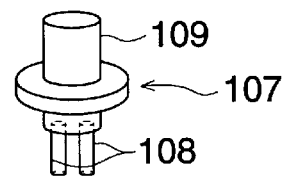
FIG. 27 is a perspective view showing a dust cleaning roller.

The third method is as follows: as shown in FIG. 25, an insert opening 106 to insert a dust cleaning roller 107 for cleaning the belt-shaped member 20, is provided in the photographic film magazine, and the dust cleaning roller 107 as shown in FIG. 27 is used. The dust cleaning roller 107 has a dust cleaning roller portion 108, around which antistatically treated nonwoven fabric having a cleaning function to remove the paste and dusts adhered to the belt-shaped member 20, by contacting with the belt-shaped member 20, is wound, and a knob 109. The dust cleaning roller portion 108 is inserted by grasping the knob 109 into the photographic magazine; as shown in FIG. 26, the dust cleaning roller 107 is rotated by ¼ turns, and the dust cleaning roller portion 108 comes into contact with the belt-shaped member 20; and the paste and dusts adhered to the belt-shaped member 20 now adhere to the roller portion 108, and the paste and dusts adhered to the belt-shaped member 20 can be removed. Then, the belt-shaped member 20 is sent from the first roller 21 to the second roller 120, and the reverse is conducted, thereby the belt-shaped member 20 is cleaned. After the cleaning, the dust cleaning roller 107 is removed from the opening 106. Incidentally, a lid to close the opening 106 is preferably provided detachably so that no dust enters from the opening 106.

The fourth method is as follows: the photographic film magazine is disassembled, and the belt-shaped member 20 is taken out together with the first roller 21 and the second roller 120 for cleaning. After the cleaning, the photographic film magazine is assembled again.

As described above, when the present invention is structured such that the photographic document which is wound and accommodated, is not in contact with the entire surface of the belt-shaped member, the following can be prevented by the simple methods: the belt-shaped member closely adheres to the photographic document, and when the photographic document is sent out, the photographic document is hardly peeled off from the belt-shaped member, thereby, the photographic document can not be stably sent out; and the paste and dusts adhered to the photographic document damage the accommodated photographic document, or the photographic document hardly peeled off from the belt-shaped member, thereby the photographic document can not be stably sent out.

EXAMPLES

Next, examples of preferable materials of constructive members in the a photographic document loading container of the present invention are as follows.

Example 1

In contrast to the photographic document loading container in FIG. 1, photographic document loading containers were formed by varying the materials and electric conductivity as shown in Table 1. The photographic documents were then loaded into the formed container at the normal temperature and humidity. Thereafter, a belt-shaped member 20 wound onto the first roller 21 was ejected together with a photographic document 70. At the normal temperature and humidity, evaluation was performed on how the photographic document was ejected from the photographic document loading container, while being based on the criteria mentioned below. Further, as the photographic document 70, short film strips prepared by cutting processed 35 mm color negative filmstrips of various companies' make into a length consisting of 6 frames were employed. These photographic documents were evaluated under two conditions in which the electric conductivity of the original exhibited $10^{-16}$ $W^{-1} \cdot cm^{-1}$ and $10^{-15}$ $W^{-1} \cdot cm^{-1}$.

X: no ejection frequently occurs
Δ: no ejection occasionally occurs However, the occurrence was within the acceptable range for commercial use
○: no ejection rarely occurs and in many cases, ejection is performed smoothly (preferably)
◎: in most cases, ejection is smoothly performed

TABLE 1

| Material | Electric Conductivity ($\Omega^{-1} \cdot cm^{-1}$) | Evaluation Electric Conductivity of Filmstrip | |
|---|---|---|---|
| | | $10^{-16}$ ($\Omega^{-1} \cdot cm^{-1}$) | $10^{-14}$ ($\Omega^{-1} \cdot cm^{-1}$) |
| 1 Polyethylene Terephthalate | $10^{-15}$ | Δ | ○ |
| 2 Polyethylene Terephthalate* | $10^{-10}$ | ◎ | ◎ |

*Titanium oxide is incorporated in polyethylene terephthalate and Pasa TL, a styrene sulfonic acid/maleic acid copolymer, manufactured by Kanebo, Ltd. is coated on it so as to exhibit an electric conductivity of $10^{-15}$ $W^{-1} \cdot cm^{-1}$.

As clearly seen in Table 1, it is found that the belt-shaped member with an electric conductivity of not less than $10^{-15}$ $W^{-1} \cdot cm^{-1}$ is subjected to stable and good ejection. Particularly, the belt-shaped member with an electric conductivity of not less than $10^{-10}$ $W^{-1} \cdot cm$ is subjected to more stable and better ejection.

Example 2

Experiments similar to those in Example 1 were performed for each of a glass epoxy resin having an electric conductivity of $10^{-15}$ $W^{-1} \cdot cm^{-1}$, and a nylon resin having an electric conductivity of $3 \times 10^{-12}$ $W^{-1} \cdot cm^{-1}$ on which inorganic oxides such as titanium oxide or anion or cation polymers such as a styrene sulfonic acid/maleic acid copolymer were appropriately coated, and similar results were obtained.

Example 3

With the photographic document loading container shown in FIG. 1, the material and electric conductivity of the first roller 21, the second roller 31, the third roller 45, the roller 37, and the roller 40 were replaced with those shown in Table 2 and photographic document loading containers were formed. The produced container was loaded with a photographic document at the normal temperature and humidity. Thereafter, the photographic document 70 was ejected together with the belt-shaped member wound onto the roller 21. The evaluation was then performed on how the photographic document was ejected from the photographic document loading container, while depending on the same evaluation criteria as those in Example 1.

TABLE 2

| Material | Electric Conductivity ($\Omega^{-1} \cdot cm^{-1}$) | Evaluation Electric Conductivity of Filmstrip | |
|---|---|---|---|
| | | $10^{-16}$ ($\Omega^{-1} \cdot cm^{-1}$) | $10^{-14}$ ($\Omega^{-1} \cdot cm^{-1}$) |
| 1 Polypropylene Resin* | $10^{-13}$ | Δ | ○ |
| 2 Polypropylene Resin* | $10^{-10}$ | ○ | ○ |
| 3 Stainless Steel | 1< | ◎ | ◎ |

*CPL-3 manufactured by Tokyo Copal Kagaku Co., Ltd. was coated on a polypropylene resin so as to exhibit the electric conductivity shown in Table 2.

As clearly seen in Table 2, it is found that when there is the roller with an electric conductivity of not less than $10^{-13}$ $W^{-1} \cdot cm^{-1}$ in contact with the belt-shaped member 20 in its conveying path, stable and good ejection is carried out, and when these rollers exhibit the electric conductivity of not less than $10^{-5}$ $W^{-1} \cdot cm^{-1}$, more stable and better ejection is carried out.

Example 4

The belt-shaped member 21, the first roller 21, and the second roller 31 were formed employing plastic materials composing carbon black having an electric conductivity of not less than $10^{-5}$ $W^{-1} \cdot cm^{-1}$; the third roller 45 and the rollers 37 were formed employing metals such as stainless steel having an electric conductivity of not less than 1 $W^{-1} \cdot cm^{-1}$, and the container 11 comprising guides 16, 17, and 18 was formed employing a plastic material comprising carbon black having an electric conductivity of not less than $10^{-5}$ $W^{-1} \cdot cm^{-1}$. A photographic document was loaded at the normal temperature and humidity. Thereafter, the photographic document 70 was ejected together with the belt-shaped member 20 wound onto the roller 21. The evaluation was then performed at the normal temperature and humidity on how the photographic document was ejected from the photographic document loading container, and it was found that exceedingly stable and good ejection was carried out.

Furthermore, under the conditions in that the photographic document exhibited the electric conductivity of not less than $10^{-15}$ $W^{-1} \cdot cm^{-1}$, no unstable ejection was perfectly observed.

Example 5

Handling properties at photofinishing laboratories and long-term ejection stability regarding 50 photographic document loading containers were evaluated, while changing the thickness of the belt-shaped member 20. Further, as the photographic documents, short filmstrips prepared by cutting, to the length of 6 frames, processed 35 mm color negative films of each company were employed for the evaluation.

Evaluation on Handling Properties at Photofinishing Laboratories

X: unless the photographic document loading container is frequently replaced, it is impossible to load the photographic documents supplied from an automatic processor, etc. It is also impossible to supply the photographic documents to an automatic printer, etc. On the contrary, more labor was needed Δ: it is necessary to sometimes replace the photographic document loading container. However, there is an advantage in commercial use ○: it is necessary to sometimes replace the photographic document loading container. However, there is a big advantage in commercial use Evaluation on Long-term Sable Ejection X: a belt-shaped member causes plastic deformation and elongation, and almost all the containers cause instability in the ejection of photographic documents within a few days Δ: after one month, a belt-shaped member causes plastic deformation and elongation, and some photographic document loading containers cause the instability in the ejection of photographic documents. However, there is no problem for commercial use ○: even after one month, a belt-shaped member causes no plastic deformation and elongation, and almost no photographic document-loading container causes the instability in the ejection of the photographic document. There is a big advantage for commercial use

TABLE 3

| Thickness | Handling Properties at Labo | Long-term Stable Ejection |
|---|---|---|
| 15 μm | ○ | ○ |
| 50 μm | ○ | ○ |
| 90 μm | ○ | ○ |

As clearly seen in Table 3, it is found that the belt-shaped member 20 having a thickness of 2 to 200 mm exhibits excellent handling properties in photofinishing laboratories and long-term stable ejection.

By setting the electric conductivity of each member at the value of the present invention, a number of photographic documents can successively be loaded without the need for splicing them, and can be ejected in order. Furthermore, after the photographic documents are loaded into the photographic document leading container, the photographic documents are conveyed together with the belt-shaped member wound onto the above-mentioned first roller and can be ejected in the stable and good manner without causing ejection troubles such as the adhesion of the photographic document on the conveyed belt-shaped member or its adhesion on the outermost circumference of the belt-shaped member wound onto the first roller.

Without the need for splicing a number of photographic documents, the successive loading can be carried out, and without causing the error in order, the sufficient quantity of the photographic documents can be loaded, while enabling the ejection without causing the error in order. Furthermore, over a long-term, the deformation of the belt-shaped member can be prevented and the stable ejection of the photographic documents can be carried out.

An effect of the first invention includes that each negative hardly comes in direct contact with another, negatives do not need to be spliced, a large number of negatives can be held in succession, and the negatives can be taken out without being disturbed in terms of their order.

An effect of the second invention is that negatives belonging to one order can be held in one negative holder without being held in a different negative holder regardless of the order, and it is still possible to hold as many negatives as possible in the negative holder.

An effect of the third invention is that a plurality of negatives can be taken up and held without being folded, even when complicated mechanism is not provided and plural negatives are not spliced.

An effect of the fourth invention is that it is possible to feed out negatives from a negative holder wherein a plurality of negatives can be taken up and held without being folded, even when complicated mechanism is not provided and plural negatives are not spliced.

What is claimed is:

1. An apparatus for accommodating a photographic document comprising:

a web member;

a first roller to which one end of the web member is fixed; and a driving force transmitting means for rotating the first roller to wind the web member thereon whereby the photographic document is wound around the first roller together with the web member, while being sandwiched between an outermost circumferential portion of the web member which has been wound around the first roller and an unwound portion of the web member which is going to be so wound;

a guide member is in contact with the outermost circumferential portion.

2. The apparatus of claim 1, further comprising:

a second roller to which the other end of the web member is fixed, wherein the second roller supplies or takes up the web member in accordance with the rotation of the first roller.

3. The apparatus of claim 2, wherein the driving force transmitting means comprises a mechanism to rotate the second roller.

4. The apparatus of claim 1, further comprising a third roller whose rotation axis is arranged parallel to the rotation axis of the first roller, wherein the web member is shaped in a S-form by the first and third rollers.

5. The apparatus of claim 1, further comprising:

detecting means for detecting a length of the web member wound on the first roller;

calculating mean for calculating a remaining length a unwound portion of the web member from the detected length of the wound web member; and control means for comparing a required length of the web member necessary for accommodating a photographic document of one order with the remaining length of the web member and for controlling the first roller so that when the controlling means judges that the remaining length is sufficient for the required length, the first roller is rotated so as to accommodate the photographic document, or when the controlling means judges that the remaining length is insufficient for the required length, the first roller is not rotated.

6. The apparatus of claim 1, wherein the web member is of conductive.

7. The apparatus of claim 6, wherein the web member has a conductivity of $10^{-10}$ or higher ($\Omega^{-1} \cdot cm^{-1}$).

8. The apparatus of claim 6, wherein the web member has a conductivity of $10^{-13}$ or higher ($\Omega^{-1} \cdot cm^{-1}$).

9. An apparatus for accommodating a photographic document comprising:
   a web member;
   a first roller to which one end of the web member is fixed; and
   a driving force transmitting means for rotating the first roller to wind the web member thereon whereby the photographic document is wound around the first roller together with the web member,
   wherein the web member has a conductivity of $10^{-15}$ or higher ($\Omega^{-1} \cdot cm^{-1}$).

10. The apparatus of claim 9, wherein the web member is coated with a conductive material.

11. The apparatus of claim 9 wherein the web member has a conductivity of $10^{-10}$ or higher ($\Omega^{-1} \cdot cm^{-1}$).

12. The apparatus of claim 10 wherein the web member has a conductivity of $10^{-13}$ or higher ($\Omega^{-1} \cdot cm^{-1}$).

13. A method of accommodating a photographic document in an accommodating apparatus provided with a web member; a first roller to which one end of the web member is fixed; and a driving force transmitting means for rotating the first roller to wind up the web member thereon, comprising:
   inserting the photographic document into the accommodating apparatus;
   rotating the first roller with driving force transmitted by the driving force transmitting means;
   winding the photographic document together with the web member around the first roller, said web member having a conductivity of at least $10^{-15}$ ($\Omega^{-1} \cdot cm^{-1}$).

14. The apparatus of claim 13, further comprising:
   an inserting section by which the photographic document is inserted in the apparatus; and
   a guide member to guide the inserted photographic document so as to be sandwiched between an outermost circumferential portion of the web member which has been wound around the first roller and a unwound portion of the web member which is going to be wound around, the guide member has a conductivity of $10^{-14}$ or higher ($\Omega^{-1} \cdot cm^{-1}$).

15. The apparatus of claim 14, wherein the guide member is arranged so as to come in contact with the outermost circumferential portion.

16. The apparatus of claim 13, further comprising:
   a second roller to which the other end of the web member is fixed, wherein the second roller supplies or takes up the web member in accordance with the rotation of the first roller.

17. The apparatus of claim 16, wherein the driving force transmitting means comprises a mechanism to rotate the second roller.

18. The apparatus of claim 13, further comprising a third roller whose rotation axis is arranged parallel to the rotation axis of the first roller, wherein the web member is shaped in a S-form by the first and third rollers.

19. The apparatus of claim 18, wherein the third roller has a conductivity of $10^{-13}$ or higher ($\Omega^{-1} \cdot cm^{-1}$).

20. The apparatus of claim 13, further comprising:
   detecting means for detecting a length of the web member wound on the first roller;
   calculating mean for calculating a remaining length of a unwound portion of the web member from the detected length of the wound web member; and
   control means for comparing a required length of the web member necessary for accommodating a photographic document of one order with the remaining length of the web member and for controlling the first roller so that when the controlling means judges that the remaining length is sufficient for the required length, the first roller is rotated so as to accommodate the photographic document, or when the controlling means judges that the remaining length is insufficient for the required length, the first roller is not rotated.

21. The apparatus of claim 13, wherein the web member is constituted such that a part of the web member dose not come in contact with the photographic document on the condition that the photographic document is wound around the first roller.

22. The apparatus of claim 13, wherein the surface of the web member which comes in contact with the photographic document is treated to be a matte surface.

23. The apparatus of claim 13, wherein the web member is provided with a plurality of holes.

24. The apparatus of claim 23, wherein the plurality of holes are formed in a longitudinal direction and a widthwise direction.

25. The apparatus of claim 23, wherein the length of the web member in its widthwise direction is greater than the length of the photographic document in its widthwise direction.

26. The apparatus of claim 21, wherein the web member comprises plural web members.

27. The apparatus of claim 21, further comprising:
   a regulating member to regulate the position of the photographic document in its widthwise direction for the web member.

28. The method of claim 13, wherein the winding step winds the photographic member around the first roller while sandwiching the photographic document between an outermost circumferential portion of the web member which has been wound around the first roller and a unwound portion of the web member which is going to be wound around.

29. The method of claim 13, wherein a winding-up speed of the first roller is faster than a conveying speed of the conveying means.

30. The method of claim 13, wherein the web member is of conductive.

31. The method of claim 30, wherein the web member has a conductivity of $10^{-10}$ or higher ($\Omega^{-1} \cdot cm^{-1}$).

32. The method of claim 30, wherein the web is coated with a conductive material.

33. The method of claim 13, wherein the inserting method serially inserts a plurality of photographic documents without splicing the plurality of photographic documents.

34. A method of accommodating a photographic document in an accommodating apparatus provided with a web member; a first roller to which one end of the web member is fixed; and a driving force transmitting means for rotating the first roller to wind up the web member thereon, comprising steps of:

inserting the photographic document into the accommodating apparatus, wherein the photographic document has a conductivity of $10^{-15}$ or higher ($\Omega^{-1} \cdot cm^{-1}$);

rotating the first roller with driving force transmitted by the driving force transmitting means; and winding up the photographic document together with the web member around the first roller.

* * * * *